(12) United States Patent
Jain et al.

(10) Patent No.: US 9,336,359 B2
(45) Date of Patent: *May 10, 2016

(54) DEVICE CERTIFICATE INDIVIDUALIZATION

(75) Inventors: Amit Jain, Sammamish, WA (US); Clifford Paul Storm, Sammamish, WA (US); Benjamin Brooks Cutter, Jr., Kirkland, WA (US); Brian Patrick Evans, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/367,198

(22) Filed: Feb. 6, 2012

(65) Prior Publication Data

US 2012/0137127 A1 May 31, 2012

Related U.S. Application Data

(63) Continuation of application No. 11/018,095, filed on Dec. 20, 2004, now Pat. No. 8,347,078, which is a continuation-in-part of application No. 10/968,462, filed on Oct. 18, 2004, now Pat. No. 7,441,121.

(51) Int. Cl.
*G06F 21/10* (2013.01)
*H04L 9/32* (2006.01)

(52) U.S. Cl.
CPC .............. *G06F 21/10* (2013.01); *H04L 9/3263* (2013.01); *H04L 9/3271* (2013.01); *H04L 2209/603* (2013.01)

(58) Field of Classification Search
CPC ............ H04L 63/0807; H04L 63/0823; H04L 63/0853; H04L 63/0876; H04L 63/0892; G06F 21/305; G06F 21/31; G06F 21/33; G06F 9/4403
USPC ........ 380/44, 285; 726/20; 713/156, 159, 173
See application file for complete search history.

(56) References Cited

U.S. PATENT DOCUMENTS

| | | |
|---|---|---|
| 3,718,906 A | 2/1973 | Lightner |
| 4,183,085 A | 1/1980 | Roberts et al. |

(Continued)

FOREIGN PATENT DOCUMENTS

| | | |
|---|---|---|
| CN | 1531673 | 9/2004 |
| EP | 0265183 A2 | 4/1988 |

(Continued)

OTHER PUBLICATIONS

"Notice of Allowance," from U.S. Appl. No. 13/711,549, Mailed Date: Jan. 29, 2015, 11 pages.

(Continued)

*Primary Examiner* — Eleni Shiferaw
*Assistant Examiner* — Paul Callahan
(74) *Attorney, Agent, or Firm* — Sunah Lee; Judy Yee; Micky Minhas

(57) ABSTRACT

A method of generating a device certificate. A method of generating a device certificate comprising, constructing a device certificate challenge at a device, sending information to a device certificate individualization server in response to the device certificate challenge, validating the device certificate challenge by the device certificate individualization server, and validating the device certificate response by the device.

23 Claims, 12 Drawing Sheets

(56) References Cited

U.S. PATENT DOCUMENTS

| | | |
|---|---|---|
| 4,323,921 A | 4/1982 | Guillou |
| 4,405,829 A | 9/1983 | Rivest et al. |
| 4,481,583 A | 11/1984 | Mueller |
| 4,528,643 A | 7/1985 | Freeny, Jr. |
| 4,529,870 A | 7/1985 | Chaum |
| 4,558,176 A | 12/1985 | Arnold et al. |
| 4,620,150 A | 10/1986 | Germer et al. |
| 4,658,093 A | 4/1987 | Hellman |
| 4,683,553 A | 7/1987 | Mollier |
| 4,750,034 A | 6/1988 | Lem |
| 4,817,094 A | 3/1989 | Lebizay et al. |
| 4,827,508 A | 5/1989 | Shear |
| 4,855,730 A | 8/1989 | Venners et al. |
| 4,855,922 A | 8/1989 | Huddleston et al. |
| 4,857,999 A | 8/1989 | Welsh |
| 4,910,692 A | 3/1990 | Outram |
| 4,916,738 A | 4/1990 | Chandra et al. |
| 4,926,479 A | 5/1990 | Goldwasser et al. |
| 4,953,209 A | 8/1990 | Ryder, Sr. et al. |
| 4,959,774 A | 9/1990 | Davis |
| 4,967,273 A | 10/1990 | Greenberg |
| 4,977,594 A | 12/1990 | Shear |
| 5,001,752 A | 3/1991 | Fischer |
| 5,012,514 A | 4/1991 | Renton |
| 5,023,907 A | 6/1991 | Johnson et al. |
| 5,047,928 A | 9/1991 | Wiedemer |
| 5,050,213 A | 9/1991 | Shear |
| 5,103,392 A | 4/1992 | Mori |
| 5,103,476 A | 4/1992 | Waite et al. |
| 5,109,413 A | 4/1992 | Comerford et al. |
| 5,117,457 A | 5/1992 | Comerford et al. |
| 5,150,420 A | 9/1992 | Haraguchi |
| 5,193,573 A | 3/1993 | Chronister |
| 5,204,897 A | 4/1993 | Wyman |
| 5,222,134 A | 6/1993 | Waite et al. |
| 5,249,184 A | 9/1993 | Woest et al. |
| 5,261,002 A | 11/1993 | Perlman et al. |
| 5,269,019 A | 12/1993 | Peterson et al. |
| 5,274,368 A | 12/1993 | Breeden et al. |
| 5,301,268 A | 4/1994 | Takeda |
| 5,303,370 A | 4/1994 | Brosh et al. |
| 5,319,705 A | 6/1994 | Halter et al. |
| 5,355,161 A | 10/1994 | Bird et al. |
| 5,369,262 A | 11/1994 | Dvorkis et al. |
| 5,406,630 A | 4/1995 | Piosenka et al. |
| 5,410,598 A | 4/1995 | Shear |
| 5,414,861 A | 5/1995 | Horning |
| 5,437,040 A | 7/1995 | Campbell |
| 5,442,704 A | 8/1995 | Holtey |
| 5,444,780 A | 8/1995 | Hartman, Jr. |
| 5,448,045 A | 9/1995 | Clark |
| 5,457,699 A | 10/1995 | Bode et al. |
| 5,459,867 A | 10/1995 | Adams et al. |
| 5,462,660 A | 10/1995 | Singleton et al. |
| 5,469,506 A | 11/1995 | Berson et al. |
| 5,473,692 A | 12/1995 | Davis |
| 5,490,216 A | 2/1996 | Richardson, III |
| 5,500,897 A | 3/1996 | Hartman, Jr. |
| 5,509,070 A | 4/1996 | Schull |
| 5,513,319 A | 4/1996 | Finch et al. |
| 5,522,040 A | 5/1996 | Hofsass et al. |
| 5,530,846 A | 6/1996 | Strong |
| 5,535,276 A | 7/1996 | Ganesan |
| 5,552,776 A | 9/1996 | Wade et al. |
| 5,553,143 A | 9/1996 | Ross et al. |
| 5,557,765 A | 9/1996 | Lipner et al. |
| 5,563,799 A | 10/1996 | Brehmer et al. |
| 5,568,552 A | 10/1996 | Davis |
| 5,586,291 A | 12/1996 | Lasker et al. |
| 5,629,980 A | 5/1997 | Stefik et al. |
| 5,634,012 A | 5/1997 | Stefik et al. |
| 5,636,292 A | 6/1997 | Rhoads |
| 5,638,443 A | 6/1997 | Stefik et al. |
| 5,638,513 A | 6/1997 | Ananda |
| 5,648,906 A | 7/1997 | Amirpanahi |
| 5,671,412 A | 9/1997 | Christiano |
| 5,673,316 A | 9/1997 | Auerbach et al. |
| 5,689,565 A | 11/1997 | Spies et al. |
| 5,708,709 A | 1/1998 | Rose |
| 5,710,706 A | 1/1998 | Markl et al. |
| 5,710,887 A | 1/1998 | Chelliah et al. |
| 5,715,403 A | 2/1998 | Stefik |
| 5,721,788 A | 2/1998 | Powell et al. |
| 5,724,425 A | 3/1998 | Chang et al. |
| 5,745,573 A | 4/1998 | Lipner et al. |
| 5,745,879 A | 4/1998 | Wyman |
| 5,754,657 A | 5/1998 | Schipper et al. |
| 5,754,763 A | 5/1998 | Bereiter |
| 5,757,908 A | 5/1998 | Cooper et al. |
| 5,758,068 A | 5/1998 | Brandt et al. |
| 5,763,832 A | 6/1998 | Anselm |
| 5,765,152 A | 6/1998 | Erickson |
| 5,768,382 A | 6/1998 | Schneier et al. |
| 5,771,354 A | 6/1998 | Crawford |
| 5,774,870 A | 6/1998 | Storey |
| 5,778,395 A | 7/1998 | Whiting et al. |
| 5,790,664 A | 8/1998 | Coley et al. |
| 5,793,839 A | 8/1998 | Farris et al. |
| 5,799,088 A | 8/1998 | Raike |
| 5,802,592 A | 9/1998 | Chess |
| 5,809,144 A | 9/1998 | Sirbu et al. |
| 5,825,876 A | 10/1998 | Peterson, Jr. |
| 5,825,877 A | 10/1998 | Dan et al. |
| 5,825,883 A | 10/1998 | Archibald et al. |
| 5,841,865 A | 11/1998 | Sudia |
| 5,844,986 A | 12/1998 | Davis |
| 5,845,065 A | 12/1998 | Conte et al. |
| 5,845,281 A | 12/1998 | Benson et al. |
| 5,864,620 A | 1/1999 | Pettitt |
| 5,872,846 A | 2/1999 | Ichikawa |
| 5,875,236 A | 2/1999 | Jankowitz et al. |
| 5,881,144 A | 3/1999 | Havens |
| 5,883,670 A | 3/1999 | Sporer et al. |
| 5,883,958 A | 3/1999 | Ishiguro et al. |
| 5,892,900 A | 4/1999 | Ginter et al. |
| 5,892,906 A | 4/1999 | Chou et al. |
| 5,893,086 A | 4/1999 | Schmuck et al. |
| 5,905,799 A | 5/1999 | Ganesan |
| 5,910,987 A | 6/1999 | Ginter et al. |
| 5,917,912 A | 6/1999 | Ginter et al. |
| 5,925,127 A | 7/1999 | Ahmad |
| 5,943,248 A | 8/1999 | Clapp |
| 5,943,422 A | 8/1999 | Van Wie et al. |
| 5,948,061 A | 9/1999 | Merriman |
| 5,949,876 A | 9/1999 | Ginter et al. |
| 5,949,877 A | 9/1999 | Traw et al. |
| 5,951,642 A | 9/1999 | Onoe et al. |
| 5,953,502 A | 9/1999 | Helbig et al. |
| 5,956,408 A | 9/1999 | Arnold |
| 5,982,891 A | 11/1999 | Ginter et al. |
| 5,983,238 A | 11/1999 | Becker et al. |
| 5,991,406 A | 11/1999 | Lipner et al. |
| 5,994,710 A | 11/1999 | Knee et al. |
| 5,995,625 A | 11/1999 | Sudia et al. |
| 6,005,945 A | 12/1999 | Whitehouse |
| 6,009,177 A | 12/1999 | Sudia |
| 6,012,487 A | 1/2000 | Hauck |
| 6,021,438 A | 2/2000 | Duvvoori |
| 6,023,510 A | 2/2000 | Epstein |
| 6,026,293 A | 2/2000 | Osborn |
| 6,049,789 A | 4/2000 | Frison et al. |
| 6,049,878 A | 4/2000 | Caronni et al. |
| 6,058,188 A | 5/2000 | Chandersekaran et al. |
| 6,058,476 A | 5/2000 | Matsuzaki et al. |
| 6,061,794 A | 5/2000 | Angelo et al. |
| 6,072,874 A | 6/2000 | Shin et al. |
| 6,073,124 A | 6/2000 | Krishnan et al. |
| 6,078,909 A | 6/2000 | Knutson |
| 6,085,976 A | 7/2000 | Sehr |
| 6,101,606 A | 8/2000 | Diersch et al. |
| 6,105,069 A | 8/2000 | Franklin et al. |
| 6,112,181 A | 8/2000 | Shear et al. |
| 6,115,712 A | 9/2000 | Islam et al. |
| 6,119,229 A | 9/2000 | Martinez et al. |

(56) References Cited

U.S. PATENT DOCUMENTS

| | | |
|---|---|---|
| 6,122,741 A | 9/2000 | Patterson et al. |
| 6,131,162 A | 10/2000 | Yoshiura et al. |
| 6,141,754 A | 10/2000 | Choy |
| 6,147,773 A | 11/2000 | Taylor |
| 6,148,417 A | 11/2000 | Da Silva |
| 6,151,676 A | 11/2000 | Cuccia et al. |
| 6,158,657 A | 12/2000 | Hall, III et al. |
| 6,163,512 A | 12/2000 | Jeun |
| 6,175,825 B1 | 1/2001 | Fruechtel |
| 6,185,678 B1 | 2/2001 | Arbaugh et al. |
| 6,188,995 B1 | 2/2001 | Garst et al. |
| 6,189,146 B1 | 2/2001 | Misra et al. |
| 6,192,392 B1 | 2/2001 | Ginter |
| 6,199,068 B1 | 3/2001 | Carpenter |
| 6,212,634 B1 | 4/2001 | Geer, Jr. et al. |
| 6,219,652 B1 | 4/2001 | Carter et al. |
| 6,219,788 B1 | 4/2001 | Flavin et al. |
| 6,223,291 B1 | 4/2001 | Puhl |
| 6,226,618 B1 | 5/2001 | Downs et al. |
| 6,226,747 B1 | 5/2001 | Larsson et al. |
| 6,230,185 B1 | 5/2001 | Salas et al. |
| 6,233,600 B1 | 5/2001 | Salas et al. |
| 6,233,685 B1 | 5/2001 | Smith |
| 6,243,439 B1 | 6/2001 | Arai et al. |
| 6,243,470 B1 | 6/2001 | Coppersmith et al. |
| 6,243,692 B1 | 6/2001 | Floyd et al. |
| 6,253,193 B1 | 6/2001 | Ginter et al. |
| 6,253,224 B1 | 6/2001 | Brice, Jr. et al. |
| 6,260,141 B1 | 7/2001 | Park |
| 6,263,313 B1 | 7/2001 | Milsted et al. |
| 6,263,431 B1 | 7/2001 | Lovelace et al. |
| 6,269,456 B1 | 7/2001 | Hodges et al. |
| 6,272,469 B1 | 8/2001 | Koritzinsky et al. |
| 6,279,111 B1 | 8/2001 | Jensenworth et al. |
| 6,279,156 B1 | 8/2001 | Amberg et al. |
| 6,286,051 B1 | 9/2001 | Becker et al. |
| 6,289,319 B1 | 9/2001 | Lockwood et al. |
| 6,289,452 B1 | 9/2001 | Arnold et al. |
| 6,295,577 B1 | 9/2001 | Anderson et al. |
| 6,298,446 B1 | 10/2001 | Schreiber et al. |
| 6,303,924 B1 | 10/2001 | Adan et al. |
| 6,304,915 B1 | 10/2001 | Nguyen et al. |
| 6,314,408 B1 | 11/2001 | Salas et al. |
| 6,314,409 B2 | 11/2001 | Schneck et al. |
| 6,321,335 B1 | 11/2001 | Chu |
| 6,327,652 B1 | 12/2001 | England et al. |
| 6,330,670 B1 | 12/2001 | England et al. |
| 6,334,189 B1 | 12/2001 | Granger et al. |
| 6,335,972 B1 | 1/2002 | Chandersekaran et al. |
| 6,343,280 B2 | 1/2002 | Clark |
| 6,345,256 B1 | 2/2002 | Milsted et al. |
| 6,345,294 B1 | 2/2002 | O'Toole et al. |
| 6,363,488 B1 | 3/2002 | Ginter et al. |
| 6,367,017 B1 | 4/2002 | Gray |
| 6,373,047 B1 | 4/2002 | Adan et al. |
| 6,374,357 B1 | 4/2002 | Mohammed et al. |
| 6,385,596 B1 | 5/2002 | Wiser et al. |
| 6,385,727 B1 | 5/2002 | Cassagnol et al. |
| 6,389,535 B1 | 5/2002 | Thomlinson et al. |
| 6,389,537 B1 | 5/2002 | Davis et al. |
| 6,389,538 B1 | 5/2002 | Gruse et al. |
| 6,389,541 B1 | 5/2002 | Patterson |
| 6,393,427 B1 | 5/2002 | Vu et al. |
| 6,397,259 B1 | 5/2002 | Lincke et al. |
| 6,398,245 B1 | 6/2002 | Gruse et al. |
| 6,405,923 B1 | 6/2002 | Seysen |
| 6,408,170 B1 | 6/2002 | Schmidt et al. |
| 6,409,089 B1 | 6/2002 | Eskicioglu |
| 6,411,941 B1 | 6/2002 | Mullor et al. |
| 6,418,421 B1 | 7/2002 | Hurtado et al. |
| 6,424,714 B1 | 7/2002 | Wasilewski et al. |
| 6,424,715 B1 | 7/2002 | Saito |
| 6,438,690 B1 | 8/2002 | Patel et al. |
| 6,441,813 B1 | 8/2002 | Ishibashi |
| 6,442,529 B1 | 8/2002 | Krishan et al. |
| 6,442,690 B1 | 8/2002 | Howard, Jr. et al. |
| 6,446,207 B1 | 9/2002 | Vanstone et al. |
| 6,449,719 B1 | 9/2002 | Baker |
| 6,450,407 B1 | 9/2002 | Freeman et al. |
| 6,460,140 B1 | 10/2002 | Schoch et al. |
| 6,463,534 B1 | 10/2002 | Geiger et al. |
| 6,490,680 B1 | 12/2002 | Scheidt et al. |
| 6,496,858 B1 | 12/2002 | Frailong et al. |
| 6,502,079 B1 | 12/2002 | Ball et al. |
| 6,505,773 B1 | 1/2003 | Palmer et al. |
| 6,510,513 B1 | 1/2003 | Danieli |
| 6,532,451 B1 | 3/2003 | Schell et al. |
| 6,539,364 B2 | 3/2003 | Moribatake et al. |
| 6,549,626 B1 | 4/2003 | Al-Salqan |
| 6,550,011 B1 | 4/2003 | Sims, III |
| 6,557,105 B1 | 4/2003 | Tardo et al. |
| 6,567,793 B1 | 5/2003 | Hicks et al. |
| 6,571,216 B1 | 5/2003 | Garg et al. |
| 6,574,609 B1 | 6/2003 | Downs et al. |
| 6,574,611 B1 | 6/2003 | Matsuyama et al. |
| 6,574,612 B1 | 6/2003 | Baratti et al. |
| 6,581,331 B1 | 6/2003 | Kral |
| 6,585,158 B2 | 7/2003 | Norskog |
| 6,587,684 B1 | 7/2003 | Hsu et al. |
| 6,587,837 B1 | 7/2003 | Spagna et al. |
| 6,609,201 B1 | 8/2003 | Folmsbee |
| 6,615,350 B1 | 9/2003 | Schell et al. |
| 6,625,729 B1 | 9/2003 | Angelo |
| 6,631,478 B1 | 10/2003 | Wang et al. |
| 6,646,244 B2 | 11/2003 | Aas et al. |
| 6,664,948 B2 | 12/2003 | Crane et al. |
| 6,665,303 B1 | 12/2003 | Saito et al. |
| 6,671,737 B1 | 12/2003 | Snowdon et al. |
| 6,671,803 B1 | 12/2003 | Pasieka |
| 6,678,828 B1 | 1/2004 | Pham et al. |
| 6,684,198 B1 | 1/2004 | Shimizu et al. |
| 6,690,556 B2 | 2/2004 | Smola et al. |
| 6,694,000 B2 | 2/2004 | Ung et al. |
| 6,698,020 B1 | 2/2004 | Zigmond et al. |
| 6,701,433 B1 | 3/2004 | Schell et al. |
| 6,704,873 B1 | 3/2004 | Underwood |
| 6,708,176 B2 | 3/2004 | Strunk et al. |
| 6,711,263 B1 | 3/2004 | Nordenstam et al. |
| 6,714,921 B2 | 3/2004 | Stefik et al. |
| 6,716,652 B1 | 4/2004 | Ortlieb |
| 6,738,810 B1 | 5/2004 | Kramer et al. |
| 6,763,458 B1 | 7/2004 | Watanabe |
| 6,765,470 B2 | 7/2004 | Shinzaki |
| 6,775,655 B1 | 8/2004 | Peinado et al. |
| 6,781,956 B1 | 8/2004 | Cheung |
| 6,791,157 B1 | 9/2004 | Casto et al. |
| 6,792,531 B2 | 9/2004 | Heiden et al. |
| 6,816,809 B2 | 11/2004 | Circenis |
| 6,816,900 B1 | 11/2004 | Vogel et al. |
| 6,820,063 B1 | 11/2004 | England et al. |
| 6,826,606 B2 | 11/2004 | Freeman et al. |
| 6,826,690 B1 | 11/2004 | Hind et al. |
| 6,834,352 B2 | 12/2004 | Shin |
| 6,837,427 B2 | 1/2005 | Overhultz et al. |
| 6,839,841 B1 | 1/2005 | Medvinsky et al. |
| 6,844,871 B1 | 1/2005 | Hinckley et al. |
| 6,847,942 B1 | 1/2005 | Land et al. |
| 6,850,252 B1 | 2/2005 | Hofberg |
| 6,851,051 B1 | 2/2005 | Bolle et al. |
| 6,856,800 B1 | 2/2005 | Henry et al. |
| 6,859,790 B1 | 2/2005 | Nonaka et al. |
| 6,868,433 B1 | 3/2005 | Philyaw |
| 6,871,283 B1 | 3/2005 | Zurko et al. |
| 6,895,504 B1 | 5/2005 | Zhang et al. |
| 6,898,286 B2 | 5/2005 | Murray |
| 6,920,567 B1 | 7/2005 | Doherty et al. |
| 6,922,724 B1 | 7/2005 | Frreman et al. |
| 6,934,840 B2 | 8/2005 | Rich et al. |
| 6,934,942 B1 | 8/2005 | Chilimbi |
| 6,954,728 B1 | 10/2005 | Kusumoto et al. |
| 6,957,186 B1 | 10/2005 | Guheen et al. |
| 6,959,288 B1 | 10/2005 | Medina et al. |
| 6,959,290 B2 | 10/2005 | Stefik |
| 6,959,291 B1 | 10/2005 | Armstrong et al. |

(56) References Cited

U.S. PATENT DOCUMENTS

| | | |
|---|---|---|
| 6,959,384 B1 | 10/2005 | Serret-Avila |
| 6,961,858 B2 | 11/2005 | Fransdonk |
| 6,973,444 B1 | 12/2005 | Blinn et al. |
| 6,974,076 B1 | 12/2005 | Siegel |
| 6,976,162 B1 | 12/2005 | Ellison et al. |
| 6,976,163 B1 | 12/2005 | Hind et al. |
| 6,983,050 B1 | 1/2006 | Yacobi et al. |
| 6,985,958 B2 | 1/2006 | Lucovsky |
| 6,986,042 B2 | 1/2006 | Griffin |
| 6,990,174 B2 | 1/2006 | Eskelinen |
| 6,993,648 B2 | 1/2006 | Goodman et al. |
| 7,000,100 B2 | 2/2006 | Lacombe et al. |
| 7,000,829 B1 | 2/2006 | Harris et al. |
| 7,010,808 B1 | 3/2006 | Leung et al. |
| 7,013,286 B1 | 3/2006 | Aggarwal et al. |
| 7,013,384 B2 | 3/2006 | Challener et al. |
| 7,017,188 B1 | 3/2006 | Schmeidler et al. |
| 7,020,704 B1 | 3/2006 | Lipscomb et al. |
| 7,024,393 B1 | 4/2006 | Peinado et al. |
| 7,028,149 B2 | 4/2006 | Grawrock |
| 7,028,180 B1 | 4/2006 | Aull et al. |
| 7,043,633 B1 | 5/2006 | Fink et al. |
| 7,051,005 B1 | 5/2006 | Peinado et al. |
| 7,052,530 B2 | 5/2006 | Edlund et al. |
| 7,054,468 B2 | 5/2006 | Yang |
| 7,055,031 B2 | 5/2006 | Platt |
| 7,055,169 B2 | 5/2006 | Delpuch et al. |
| 7,058,819 B2 | 6/2006 | Okane |
| 7,069,442 B2 | 6/2006 | Sutton, II |
| 7,069,595 B2 | 6/2006 | Cognigni et al. |
| 7,073,056 B2 | 7/2006 | Kocher |
| 7,073,063 B2 | 7/2006 | Peinado |
| 7,076,652 B2 | 7/2006 | Ginter et al. |
| 7,080,039 B1 | 7/2006 | Marsh |
| 7,089,594 B2 | 8/2006 | Lai et al. |
| 7,095,852 B2 | 8/2006 | Wack et al. |
| 7,096,469 B1 | 8/2006 | Kubala et al. |
| 7,097,357 B2 | 8/2006 | Johnson et al. |
| 7,100,199 B2 | 8/2006 | Ginter et al. |
| 7,103,574 B1 | 9/2006 | Peinado et al. |
| 7,113,912 B2 | 9/2006 | Stefik |
| 7,116,969 B2 | 10/2006 | Park |
| 7,117,183 B2 | 10/2006 | Blair et al. |
| 7,121,460 B1 | 10/2006 | Parsons et al. |
| 7,123,608 B1 | 10/2006 | Scott et al. |
| 7,124,115 B1 | 10/2006 | Herzberg et al. |
| 7,124,938 B1 | 10/2006 | Marsh |
| 7,127,579 B2 | 10/2006 | Zimmer |
| 7,130,951 B1 | 10/2006 | Christie et al. |
| 7,133,846 B1 | 11/2006 | Ginter et al. |
| 7,136,838 B1 | 11/2006 | Peinado et al. |
| 7,143,066 B2 | 11/2006 | Shear et al. |
| 7,143,297 B2 | 11/2006 | Buchheit et al. |
| 7,146,504 B2 | 12/2006 | Parks et al. |
| 7,162,645 B2 | 1/2007 | Iguchi et al. |
| 7,171,539 B2 | 1/2007 | Mansell et al. |
| 7,174,457 B1 | 2/2007 | England et al. |
| 7,194,092 B1 | 3/2007 | England et al. |
| 7,203,966 B2 | 4/2007 | Abburi et al. |
| 7,207,039 B2 | 4/2007 | Komarla et al. |
| 7,213,005 B2 | 5/2007 | Mourad et al. |
| 7,213,266 B1 | 5/2007 | Maher et al. |
| 7,216,363 B2 | 5/2007 | Serkowski et al. |
| 7,216,368 B2 | 5/2007 | Ishiguro |
| 7,219,071 B2 | 5/2007 | Gallagher |
| 7,222,062 B2 | 5/2007 | Goud et al. |
| 7,224,805 B2 | 5/2007 | Hurst et al. |
| 7,233,948 B1 | 6/2007 | Shamoon et al. |
| 7,234,144 B2 | 6/2007 | Wilt et al. |
| 7,234,638 B2 | 6/2007 | Lee et al. |
| 7,236,455 B1 | 6/2007 | Proudler et al. |
| 7,254,836 B2 | 8/2007 | Alkove et al. |
| 7,260,721 B2 | 8/2007 | Tanaka et al. |
| 7,266,569 B2 | 9/2007 | Cutter et al. |
| 7,266,714 B2 | 9/2007 | Davies et al. |
| 7,269,846 B2 | 9/2007 | Chennakeshu et al. |
| 7,284,124 B1 | 10/2007 | Ginsberg |
| 7,296,154 B2 | 11/2007 | Evans et al. |
| 7,296,296 B2 | 11/2007 | Dunbar et al. |
| 7,299,292 B2 | 11/2007 | Morten et al. |
| 7,299,358 B2 | 11/2007 | Chateau et al. |
| 7,302,709 B2 | 11/2007 | England et al. |
| 7,306,143 B2 | 12/2007 | Bonneau et al. |
| 7,310,732 B2 | 12/2007 | Matsuyama et al. |
| 7,315,941 B2 | 1/2008 | Ramzan et al. |
| 7,336,791 B2 | 2/2008 | Ishiguro |
| 7,343,496 B1 | 3/2008 | Hsiang et al. |
| 7,353,209 B1 | 4/2008 | Peinado et al. |
| 7,353,267 B1 | 4/2008 | Cunningham et al. |
| 7,353,402 B2 | 4/2008 | Bourne et al. |
| 7,356,682 B2 | 4/2008 | Lampson et al. |
| 7,356,709 B2 | 4/2008 | Gunyakti et al. |
| 7,359,807 B2 | 4/2008 | Frank et al. |
| 7,360,253 B2 | 4/2008 | Frank et al. |
| 7,376,834 B2 | 5/2008 | Edward et al. |
| 7,376,976 B2 | 5/2008 | Fierstein et al. |
| 7,382,883 B2 | 6/2008 | Cross et al. |
| 7,383,205 B1 | 6/2008 | Peinado et al. |
| 7,392,429 B2 | 6/2008 | Westerinen et al. |
| 7,395,245 B2 | 7/2008 | Okamoto et al. |
| 7,395,452 B2 | 7/2008 | Nicholson et al. |
| 7,406,446 B2 | 7/2008 | Frank et al. |
| 7,421,413 B2 | 9/2008 | Frank et al. |
| 7,426,752 B2 | 9/2008 | Agrawal et al. |
| 7,441,121 B2 | 10/2008 | Cutter, Jr. et al. |
| 7,441,246 B2 | 10/2008 | Auerbach et al. |
| 7,444,509 B2 | 10/2008 | Nadalin et al. |
| 7,447,303 B1 | 11/2008 | Moneymaker |
| 7,451,202 B2 | 11/2008 | Nakahara et al. |
| 7,461,249 B1 | 12/2008 | Pearson et al. |
| 7,464,103 B2 | 12/2008 | Siu |
| 7,490,356 B2 | 2/2009 | Lieblich et al. |
| 7,493,487 B2 | 2/2009 | Phillips et al. |
| 7,494,277 B2 | 2/2009 | Setala |
| 7,500,267 B2 | 3/2009 | McKune et al. |
| 7,502,945 B2 | 3/2009 | Bourne |
| 7,506,053 B1 | 3/2009 | Qin |
| 7,516,480 B2 | 4/2009 | Pearson et al. |
| 7,519,816 B2 | 4/2009 | Phillips et al. |
| 7,526,649 B2 | 4/2009 | Wiseman |
| 7,539,863 B2 | 5/2009 | Phillips |
| 7,540,024 B2 | 5/2009 | Phillips et al. |
| 7,549,060 B2 | 6/2009 | Bourne et al. |
| 7,552,331 B2 | 6/2009 | Evans et al. |
| 7,558,463 B2 | 7/2009 | Jain et al. |
| 7,562,220 B2 | 7/2009 | Frank et al. |
| 7,565,325 B2 | 7/2009 | Lenard |
| 7,568,096 B2 | 7/2009 | Evans et al. |
| 7,568,211 B2 | 7/2009 | Mai et al. |
| 7,571,488 B2 | 8/2009 | Oho et al. |
| 7,584,149 B1 | 9/2009 | Bishop et al. |
| 7,584,502 B2 | 9/2009 | Alkove et al. |
| 7,590,841 B2 | 9/2009 | Sherwani et al. |
| 7,596,784 B2 | 9/2009 | Abrams |
| 7,610,486 B2 | 10/2009 | Hermann et al. |
| 7,610,631 B2 | 10/2009 | Frank et al. |
| 7,613,599 B2 | 11/2009 | Bade et al. |
| 7,617,401 B2 | 11/2009 | Marsh et al. |
| 7,634,661 B2 | 12/2009 | England et al. |
| 7,644,239 B2 | 1/2010 | Westerinen et al. |
| 7,653,943 B2 | 1/2010 | Evans et al. |
| 7,665,143 B2 | 2/2010 | Havens et al. |
| 7,669,056 B2 | 2/2010 | Frank |
| 7,680,744 B2 | 3/2010 | Blinn et al. |
| 7,694,153 B2 | 4/2010 | Ahdout et al. |
| 7,703,141 B2 | 4/2010 | Alkove et al. |
| 7,739,505 B2 | 6/2010 | Reneris et al. |
| 7,752,674 B2 | 7/2010 | Evans et al. |
| 7,769,174 B2 | 8/2010 | Cho et al. |
| 7,770,205 B2 | 8/2010 | Frank |
| 7,809,646 B2 * | 10/2010 | Rose .................. 705/51 |
| 7,810,163 B2 | 10/2010 | Evans et al. |
| 7,814,532 B2 | 10/2010 | Cromer et al. |
| 7,877,607 B2 | 1/2011 | Circenis |

(56) References Cited

U.S. PATENT DOCUMENTS

| | | |
|---|---|---|
| 7,891,007 B2 | 2/2011 | Waxman et al. |
| 7,900,140 B2 | 3/2011 | Mohammed et al. |
| 7,903,117 B2 | 3/2011 | Howell et al. |
| 7,958,029 B1 | 6/2011 | Bobich et al. |
| 7,979,721 B2 | 7/2011 | Westerinen |
| 8,060,923 B2 | 11/2011 | Cutter et al. |
| 8,074,287 B2 | 12/2011 | Barde et al. |
| 8,176,564 B2 | 5/2012 | Frank et al. |
| 8,336,085 B2 | 12/2012 | Thirumala et al. |
| 2001/0010076 A1 | 7/2001 | Wray |
| 2001/0021252 A1 | 9/2001 | Carter et al. |
| 2001/0034711 A1 | 10/2001 | Tashenberg |
| 2001/0044782 A1 | 11/2001 | Hughes |
| 2001/0049667 A1 | 12/2001 | Moribatake et al. |
| 2001/0051996 A1 | 12/2001 | Cooper et al. |
| 2001/0052077 A1 | 12/2001 | Fung et al. |
| 2001/0053223 A1 | 12/2001 | Ishibashi et al. |
| 2001/0056413 A1 | 12/2001 | Satoru et al. |
| 2001/0056539 A1 | 12/2001 | Pavlin et al. |
| 2002/0002597 A1 | 1/2002 | Morrell, Jr. |
| 2002/0007310 A1 | 1/2002 | Long |
| 2002/0007314 A1 | 1/2002 | Maruyama |
| 2002/0013772 A1 | 1/2002 | Peinado |
| 2002/0016752 A1 | 2/2002 | Suh |
| 2002/0019814 A1 | 2/2002 | Ganesan |
| 2002/0023212 A1 | 2/2002 | Proudler |
| 2002/0026574 A1 | 2/2002 | Watanabe et al. |
| 2002/0044654 A1 | 4/2002 | Maeda et al. |
| 2002/0046098 A1 | 4/2002 | Maggio |
| 2002/0049679 A1 | 4/2002 | Russell et al. |
| 2002/0055906 A1 | 5/2002 | Katz et al. |
| 2002/0063933 A1 | 5/2002 | Maeda et al. |
| 2002/0065781 A1 | 5/2002 | Hillegass et al. |
| 2002/0073068 A1 | 6/2002 | Guha |
| 2002/0091569 A1 | 7/2002 | Kitaura et al. |
| 2002/0095603 A1 | 7/2002 | Godwin et al. |
| 2002/0107701 A1 | 8/2002 | Batty et al. |
| 2002/0107809 A1 | 8/2002 | Biddle et al. |
| 2002/0111916 A1 | 8/2002 | Coronna et al. |
| 2002/0112171 A1 | 8/2002 | Ginter et al. |
| 2002/0118835 A1 | 8/2002 | Uemura |
| 2002/0123964 A1 | 9/2002 | Kramer et al. |
| 2002/0124212 A1 | 9/2002 | Nitschke et al. |
| 2002/0129359 A1 | 9/2002 | Lichner |
| 2002/0138549 A1 | 9/2002 | Urien |
| 2002/0141451 A1 | 10/2002 | Gates et al. |
| 2002/0144131 A1 | 10/2002 | Spacey |
| 2002/0147601 A1 | 10/2002 | Fagan |
| 2002/0147782 A1 | 10/2002 | Dimitrova et al. |
| 2002/0147912 A1 | 10/2002 | Shmueli et al. |
| 2002/0169974 A1 | 11/2002 | McKune |
| 2002/0178071 A1 | 11/2002 | Walker et al. |
| 2002/0184482 A1 | 12/2002 | Lacombe et al. |
| 2002/0184508 A1 | 12/2002 | Bialick et al. |
| 2002/0186843 A1 | 12/2002 | Weinstein et al. |
| 2002/0193101 A1 | 12/2002 | McAlinden |
| 2002/0194132 A1 | 12/2002 | Pearson et al. |
| 2002/0198845 A1 | 12/2002 | Lao et al. |
| 2002/0198846 A1 | 12/2002 | Lao |
| 2003/0005135 A1 | 1/2003 | Inoue et al. |
| 2003/0005335 A1 | 1/2003 | Watanabe |
| 2003/0014323 A1 | 1/2003 | Scheer |
| 2003/0014496 A1 | 1/2003 | Spencer et al. |
| 2003/0014673 A1 | 1/2003 | Baum et al. |
| 2003/0018969 A1 | 1/2003 | Humpleman et al. |
| 2003/0021416 A1 | 1/2003 | Brown et al. |
| 2003/0023564 A1 | 1/2003 | Padhye et al. |
| 2003/0027549 A1 | 2/2003 | Kiel et al. |
| 2003/0028454 A1 | 2/2003 | Ooho et al. |
| 2003/0033543 A1 | 2/2003 | Hubbard et al. |
| 2003/0035409 A1 | 2/2003 | Wang et al. |
| 2003/0037246 A1 | 2/2003 | Goodman et al. |
| 2003/0040960 A1 | 2/2003 | Eckmann |
| 2003/0041008 A1 | 2/2003 | Grey et al. |
| 2003/0046026 A1 | 3/2003 | Levy et al. |
| 2003/0046238 A1 | 3/2003 | Nonaka et al. |
| 2003/0048473 A1 | 3/2003 | Rosen |
| 2003/0050831 A1 | 3/2003 | Kiayh |
| 2003/0056107 A1 | 3/2003 | Cammack et al. |
| 2003/0065918 A1 | 4/2003 | Willey |
| 2003/0069854 A1 | 4/2003 | Hsu et al. |
| 2003/0069981 A1 | 4/2003 | Trovato |
| 2003/0078853 A1 | 4/2003 | Peinado et al. |
| 2003/0084104 A1 | 5/2003 | Salem et al. |
| 2003/0084278 A1 | 5/2003 | Cromer et al. |
| 2003/0084285 A1 | 5/2003 | Cromer et al. |
| 2003/0084337 A1 | 5/2003 | Simionescu et al. |
| 2003/0084352 A1 | 5/2003 | Schwartz et al. |
| 2003/0088500 A1 | 5/2003 | Shinohara et al. |
| 2003/0093694 A1 | 5/2003 | Medvinsky et al. |
| 2003/0097596 A1 | 5/2003 | Muratov et al. |
| 2003/0110388 A1 | 6/2003 | Pavlin et al. |
| 2003/0115458 A1 | 6/2003 | Song |
| 2003/0120935 A1 | 6/2003 | Teal et al. |
| 2003/0126519 A1 | 7/2003 | Odorcic |
| 2003/0131252 A1 | 7/2003 | Barton et al. |
| 2003/0133576 A1 | 7/2003 | Grumiaux |
| 2003/0135380 A1 | 7/2003 | Lehr et al. |
| 2003/0149670 A1 | 8/2003 | Cronee |
| 2003/0149671 A1 | 8/2003 | Yamamoto et al. |
| 2003/0149875 A1 | 8/2003 | Hosaka |
| 2003/0156572 A1 | 8/2003 | Hui et al. |
| 2003/0156719 A1 | 8/2003 | Cronce |
| 2003/0163383 A1 | 8/2003 | Engelhart |
| 2003/0163712 A1 | 8/2003 | LaMothe et al. |
| 2003/0172376 A1 | 9/2003 | Coffin, III et al. |
| 2003/0185395 A1 | 10/2003 | Lee et al. |
| 2003/0188165 A1 | 10/2003 | Sutton et al. |
| 2003/0188179 A1 | 10/2003 | Challener et al. |
| 2003/0194094 A1 | 10/2003 | Lampson |
| 2003/0196102 A1 | 10/2003 | McCarroll |
| 2003/0196106 A1 | 10/2003 | Erfani et al. |
| 2003/0198350 A1 | 10/2003 | Foster et al. |
| 2003/0200336 A1 | 10/2003 | Pal et al. |
| 2003/0208338 A1 | 11/2003 | Challener et al. |
| 2003/0208573 A1 | 11/2003 | Harrison et al. |
| 2003/0208673 A1 | 11/2003 | Chaudhry et al. |
| 2003/0229702 A1 | 12/2003 | Hensbergen et al. |
| 2003/0233553 A1 | 12/2003 | Parks et al. |
| 2003/0236756 A1 | 12/2003 | Humpleman et al. |
| 2004/0001088 A1 | 1/2004 | Stancil et al. |
| 2004/0001594 A1 | 1/2004 | Krishnaswamy et al. |
| 2004/0003190 A1 | 1/2004 | Childs et al. |
| 2004/0003268 A1 | 1/2004 | Bourne et al. |
| 2004/0003269 A1 | 1/2004 | Waxman et al. |
| 2004/0003270 A1 | 1/2004 | Bourne et al. |
| 2004/0003288 A1 | 1/2004 | Wiseman et al. |
| 2004/0010440 A1 | 1/2004 | Lenard et al. |
| 2004/0019456 A1 | 1/2004 | Cirenis |
| 2004/0023636 A1 | 2/2004 | Gurel et al. |
| 2004/0030912 A1 | 2/2004 | Merkle, Jr. et al. |
| 2004/0034816 A1 | 2/2004 | Richard |
| 2004/0039916 A1 | 2/2004 | Aldis et al. |
| 2004/0039924 A1 | 2/2004 | Baldwin et al. |
| 2004/0039960 A1 | 2/2004 | Kassayan |
| 2004/0044629 A1 | 3/2004 | Rhodes et al. |
| 2004/0054678 A1 | 3/2004 | Okomoto et al. |
| 2004/0054907 A1 | 3/2004 | Chateau et al. |
| 2004/0054908 A1 | 3/2004 | Circenis et al. |
| 2004/0054909 A1 | 3/2004 | Serkowski et al. |
| 2004/0059937 A1 | 3/2004 | Nakano |
| 2004/0064351 A1 | 4/2004 | Mikurak |
| 2004/0064707 A1 | 4/2004 | McCann et al. |
| 2004/0067746 A1 | 4/2004 | Johnson |
| 2004/0073670 A1 | 4/2004 | Chack et al. |
| 2004/0088548 A1 | 5/2004 | Smetters et al. |
| 2004/0093371 A1 | 5/2004 | Burrows et al. |
| 2004/0093508 A1 | 5/2004 | Foerstner et al. |
| 2004/0107125 A1 | 6/2004 | Guheen et al. |
| 2004/0107356 A1 | 6/2004 | Shamoon et al. |
| 2004/0107359 A1 | 6/2004 | Kawano et al. |
| 2004/0107368 A1 | 6/2004 | Colvin |
| 2004/0111615 A1 | 6/2004 | Nyang et al. |
| 2004/0123127 A1 | 6/2004 | Teicher et al. |

(56) References Cited

U.S. PATENT DOCUMENTS

| | | |
|---|---|---|
| 2004/0125755 A1 | 7/2004 | Roberts |
| 2004/0128251 A1 | 7/2004 | Chris et al. |
| 2004/0133794 A1 | 7/2004 | Kocher et al. |
| 2004/0139027 A1 | 7/2004 | Molaro |
| 2004/0139312 A1 | 7/2004 | Medvinsky |
| 2004/0146015 A1 | 7/2004 | Cross et al. |
| 2004/0158742 A1 | 8/2004 | Srinvasan et al. |
| 2004/0184605 A1 | 9/2004 | Soliman |
| 2004/0193919 A1 | 9/2004 | Dabbish et al. |
| 2004/0199769 A1 | 10/2004 | Proudler |
| 2004/0205028 A1 | 10/2004 | Verosub et al. |
| 2004/0205357 A1 | 10/2004 | Kuo et al. |
| 2004/0205510 A1 | 10/2004 | Rising |
| 2004/0220858 A1 | 11/2004 | Maggio |
| 2004/0225894 A1 | 11/2004 | Colvin |
| 2004/0255000 A1 | 12/2004 | Simionescu et al. |
| 2004/0268120 A1 | 12/2004 | Mirtal et al. |
| 2005/0015343 A1 | 1/2005 | Nagai et al. |
| 2005/0021944 A1 | 1/2005 | Craft et al. |
| 2005/0021992 A1 | 1/2005 | Aida et al. |
| 2005/0028000 A1 | 2/2005 | Bulusu et al. |
| 2005/0033747 A1 | 2/2005 | Wittkotter |
| 2005/0039013 A1 | 2/2005 | Bajikar et al. |
| 2005/0044197 A1 | 2/2005 | Lai |
| 2005/0044397 A1 | 2/2005 | Bjorkengren |
| 2005/0050355 A1 | 3/2005 | Graunke |
| 2005/0060388 A1 | 3/2005 | Tatsumi et al. |
| 2005/0065880 A1 | 3/2005 | Amato et al. |
| 2005/0080701 A1 | 4/2005 | Tunney et al. |
| 2005/0080801 A1 | 4/2005 | Kothandaraman et al. |
| 2005/0086174 A1 | 4/2005 | Eng |
| 2005/0091104 A1 | 4/2005 | Abraham |
| 2005/0097204 A1 | 5/2005 | Horowitz et al. |
| 2005/0102181 A1 | 5/2005 | Scroggie et al. |
| 2005/0108547 A1 | 5/2005 | Sakai |
| 2005/0108564 A1 | 5/2005 | Freeman et al. |
| 2005/0120125 A1 | 6/2005 | Morten et al. |
| 2005/0120251 A1 | 6/2005 | Fukumori |
| 2005/0125673 A1 | 6/2005 | Cheng et al. |
| 2005/0129296 A1 | 6/2005 | Setala |
| 2005/0132150 A1 | 6/2005 | Jewell et al. |
| 2005/0138338 A1 | 6/2005 | Pagnetti et al. |
| 2005/0138370 A1 | 6/2005 | Goud et al. |
| 2005/0138389 A1 | 6/2005 | Catherman et al. |
| 2005/0138406 A1 | 6/2005 | Cox |
| 2005/0138423 A1 | 6/2005 | Ranganathan |
| 2005/0141717 A1 | 6/2005 | Cromer et al. |
| 2005/0144073 A1 | 6/2005 | Morrisroe et al. |
| 2005/0144099 A1 | 6/2005 | Deb et al. |
| 2005/0149722 A1 | 7/2005 | Wiseman |
| 2005/0149723 A1 | 7/2005 | Watkins et al. |
| 2005/0149729 A1 | 7/2005 | Zimmer et al. |
| 2005/0166051 A1 | 7/2005 | Buer |
| 2005/0172121 A1 | 8/2005 | Risan et al. |
| 2005/0182921 A1 | 8/2005 | Duncan |
| 2005/0182940 A1 | 8/2005 | Sutton |
| 2005/0188843 A1 | 9/2005 | Edlund et al. |
| 2005/0198510 A1 | 9/2005 | Robert et al. |
| 2005/0203801 A1 | 9/2005 | Morgenstern et al. |
| 2005/0210252 A1 | 9/2005 | Freeman et al. |
| 2005/0213761 A1 | 9/2005 | Walmsley et al. |
| 2005/0216346 A1 | 9/2005 | Kusumoto et al. |
| 2005/0216577 A1 | 9/2005 | Durham et al. |
| 2005/0221766 A1 | 10/2005 | Brizek et al. |
| 2005/0226170 A1 | 10/2005 | Relan et al. |
| 2005/0235141 A1 | 10/2005 | Ibrahim et al. |
| 2005/0240533 A1 | 10/2005 | Cutter et al. |
| 2005/0246521 A1 | 11/2005 | Bade et al. |
| 2005/0246525 A1 | 11/2005 | Bade et al. |
| 2005/0246552 A1 | 11/2005 | Bade et al. |
| 2005/0257073 A1 | 11/2005 | Bade |
| 2005/0268115 A1 | 12/2005 | Barde et al. |
| 2005/0268174 A1 | 12/2005 | Kumagai |
| 2005/0275866 A1 | 12/2005 | Corlett |
| 2005/0278519 A1 | 12/2005 | Luebke et al. |
| 2005/0279827 A1 | 12/2005 | Mascavage et al. |
| 2005/0283601 A1 | 12/2005 | Tahan |
| 2005/0286476 A1 | 12/2005 | Crosswy et al. |
| 2005/0289177 A1 | 12/2005 | Hohmann, II |
| 2005/0289343 A1 | 12/2005 | Tahan |
| 2006/0010076 A1 | 1/2006 | Cutter et al. |
| 2006/0010326 A1 | 1/2006 | Bade et al. |
| 2006/0015717 A1 | 1/2006 | Liu et al. |
| 2006/0015718 A1 | 1/2006 | Liu et al. |
| 2006/0015732 A1 | 1/2006 | Liu |
| 2006/0020784 A1 | 1/2006 | Jonker et al. |
| 2006/0020821 A1 | 1/2006 | Waltermann et al. |
| 2006/0020860 A1 | 1/2006 | Tardif et al. |
| 2006/0026418 A1 | 2/2006 | Bade |
| 2006/0026419 A1 | 2/2006 | Arndt et al. |
| 2006/0026422 A1 | 2/2006 | Bade et al. |
| 2006/0026569 A1 | 2/2006 | Oerting et al. |
| 2006/0041754 A1 | 2/2006 | Hind et al. |
| 2006/0045267 A1 | 3/2006 | Moore et al. |
| 2006/0053112 A1 | 3/2006 | Chitkara et al. |
| 2006/0055506 A1 | 3/2006 | Nicolas |
| 2006/0072748 A1 | 4/2006 | Buer |
| 2006/0072762 A1 | 4/2006 | Buer |
| 2006/0074600 A1 | 4/2006 | Sastry et al. |
| 2006/0075014 A1 | 4/2006 | Tharappel et al. |
| 2006/0075223 A1 | 4/2006 | Bade et al. |
| 2006/0085634 A1 | 4/2006 | Jain et al. |
| 2006/0085637 A1 | 4/2006 | Pinkas |
| 2006/0085844 A1 | 4/2006 | Buer et al. |
| 2006/0089917 A1 | 4/2006 | Strom et al. |
| 2006/0090084 A1 | 4/2006 | Buer |
| 2006/0100010 A1 | 5/2006 | Gatto et al. |
| 2006/0101155 A1 | 5/2006 | Damour et al. |
| 2006/0106845 A1 | 5/2006 | Frank et al. |
| 2006/0106920 A1 | 5/2006 | Steeb et al. |
| 2006/0107306 A1 | 5/2006 | Thirumalai et al. |
| 2006/0107328 A1 | 5/2006 | Frank et al. |
| 2006/0107335 A1 | 5/2006 | Frank et al. |
| 2006/0112267 A1 | 5/2006 | Zimmer et al. |
| 2006/0117177 A1 | 6/2006 | Buer |
| 2006/0129496 A1 | 6/2006 | Chow et al. |
| 2006/0129824 A1 | 6/2006 | Hoff et al. |
| 2006/0130130 A1 | 6/2006 | Kablotsky |
| 2006/0136717 A1 | 6/2006 | Buer et al. |
| 2006/0143431 A1 | 6/2006 | Rothman |
| 2006/0149966 A1 | 7/2006 | Buskey et al. |
| 2006/0156008 A1 | 7/2006 | Frank et al. |
| 2006/0156416 A1 | 7/2006 | Huotari et al. |
| 2006/0165005 A1 | 7/2006 | Frank et al. |
| 2006/0165227 A1 | 7/2006 | Steeb et al. |
| 2006/0167814 A1 | 7/2006 | Peinado |
| 2006/0167815 A1 | 7/2006 | Peinado et al. |
| 2006/0168664 A1 | 7/2006 | Frank et al. |
| 2006/0173787 A1 | 8/2006 | Weber et al. |
| 2006/0174110 A1 | 8/2006 | Storm et al. |
| 2006/0206618 A1 | 9/2006 | Zimmer et al. |
| 2006/0212350 A1 | 9/2006 | Ellis et al. |
| 2006/0212363 A1 | 9/2006 | Peinado |
| 2006/0212945 A1 | 9/2006 | Donlin |
| 2006/0213997 A1 | 9/2006 | Frank et al. |
| 2006/0227364 A1 | 10/2006 | Frank et al. |
| 2006/0229990 A1 | 10/2006 | Shimoji et al. |
| 2006/0235798 A1 | 10/2006 | Alkove et al. |
| 2006/0235799 A1 | 10/2006 | Evans et al. |
| 2006/0235801 A1 | 10/2006 | Storm et al. |
| 2006/0242406 A1 | 10/2006 | Barde et al. |
| 2006/0248594 A1 | 11/2006 | Grigorovich et al. |
| 2006/0248596 A1 | 11/2006 | Jain et al. |
| 2006/0265493 A1 | 11/2006 | Brindley et al. |
| 2006/0265508 A1 | 11/2006 | Angel et al. |
| 2006/0265758 A1 | 11/2006 | Khandelwal et al. |
| 2006/0282319 A1 | 12/2006 | Maggio |
| 2006/0282899 A1 | 12/2006 | Raciborski |
| 2007/0033102 A1 | 2/2007 | Frank et al. |
| 2007/0058807 A1 | 3/2007 | Marsh |
| 2007/0106521 A1 | 5/2007 | Ho et al. |
| 2007/0214043 A1 | 9/2007 | Yasuda |
| 2007/0280422 A1 | 12/2007 | Setala |
| 2008/0021909 A1 | 1/2008 | Black et al. |

(56) References Cited

U.S. PATENT DOCUMENTS

| | | | |
|---|---|---|---|
| 2008/0254883 | A1 | 10/2008 | Patel et al. |
| 2008/0307495 | A1 | 12/2008 | Hotzman et al. |
| 2009/0070454 | A1 | 3/2009 | McKinnon, III et al. |
| 2009/0132815 | A1 | 5/2009 | Ginter et al. |
| 2009/0158036 | A1 | 6/2009 | Barde et al. |
| 2010/0177891 | A1 | 7/2010 | Keider |
| 2011/0128290 | A1 | 6/2011 | Howell et al. |
| 2012/0137127 | A1 | 5/2012 | Jain |

FOREIGN PATENT DOCUMENTS

| | | |
|---|---|---|
| EP | 0613073 A1 | 8/1994 |
| EP | 0635790 | 1/1995 |
| EP | 0665486 A2 | 8/1995 |
| EP | 0671711 A1 | 9/1995 |
| EP | 0709760 B1 | 5/1996 |
| EP | 0715245 B1 | 6/1996 |
| EP | 0715246 B1 | 6/1996 |
| EP | 0715247 B1 | 6/1996 |
| EP | 0725512 B1 | 8/1996 |
| EP | 0752663 B1 | 1/1997 |
| EP | 0778512 A2 | 6/1997 |
| EP | 0789361 A2 | 8/1997 |
| EP | 0843449 | 5/1998 |
| EP | 0849658 A2 | 6/1998 |
| EP | 0874300 A2 | 10/1998 |
| EP | 0887723 A2 | 12/1998 |
| EP | 0874300 A3 | 10/1999 |
| EP | 0778512 A3 | 12/2000 |
| EP | 1061465 | 12/2000 |
| EP | 1085396 | 3/2001 |
| EP | 1287636 A0 | 3/2003 |
| EP | 1292065 A1 | 3/2003 |
| EP | 1330759 A0 | 7/2003 |
| EP | 1363424 A2 | 11/2003 |
| EP | 1378811 A2 | 1/2004 |
| EP | 1387237 | 2/2004 |
| EP | 1363424 A3 | 5/2004 |
| EP | 1429224 | 6/2004 |
| EP | 1223722 | 8/2004 |
| EP | 1442388 A0 | 8/2004 |
| EP | 1460514 | 9/2004 |
| EP | 1233337 | 8/2005 |
| EP | 0798892 B1 | 7/2006 |
| EP | 1378811 A3 | 11/2006 |
| EP | 0887723 A3 | 8/2007 |
| EP | 1120967 B1 | 3/2010 |
| GB | 2359969 | 9/2001 |
| GB | 2378780 | 2/2003 |
| GB | 0411654 | 6/2004 |
| JP | 2291043 | 11/1990 |
| JP | H0535461 | 2/1993 |
| JP | H0635718 | 2/1994 |
| JP | H07036559 | 2/1995 |
| JP | H07141153 | 6/1995 |
| JP | H086729 | 1/1996 |
| JP | 9006880 | 1/1997 |
| JP | 2001526550 | 5/1997 |
| JP | H09185504 | 7/1997 |
| JP | H9251494 | 9/1997 |
| JP | 9069044 | 11/1997 |
| JP | H1091556 | 4/1998 |
| JP | 2000293369 | 10/2000 |
| JP | 2001051742 | 2/2001 |
| JP | 2003510684 | 3/2001 |
| JP | 2001101033 | 4/2001 |
| JP | 2003510713 | 4/2001 |
| JP | 2001175605 | 6/2001 |
| JP | 2001184472 | 7/2001 |
| JP | 2001312325 | 11/2001 |
| JP | 2001331229 | 11/2001 |
| JP | 2001338233 | 12/2001 |
| JP | 2002108478 | 4/2002 |
| JP | 2002108870 | 4/2002 |
| JP | 2002251478 | 9/2002 |
| JP | 2002374327 | 12/2002 |
| JP | 2003507785 | 2/2003 |
| JP | 2003140761 | 5/2003 |
| JP | 2003140762 | 5/2003 |
| JP | 2003157335 | 5/2003 |
| JP | 2003208314 | 7/2003 |
| JP | 2003242415 | 8/2003 |
| JP | 2003248522 | 9/2003 |
| JP | 2003296487 | 10/2003 |
| JP | 2002182562 | 1/2004 |
| JP | 200454932 | 2/2004 |
| JP | 2004062561 | 2/2004 |
| JP | 2004118327 | 4/2004 |
| JP | 2004164491 | 6/2004 |
| JP | 2004295846 | 10/2004 |
| JP | 2004304755 | 10/2004 |
| JP | 2005190481 | 7/2005 |
| JP | 2007525774 | 9/2007 |
| JP | H08-054952 | 2/2011 |
| KR | 10-1999025230 A | 4/1999 |
| KR | 20010000805 | 1/2001 |
| KR | 10-20010103359 A | 11/2001 |
| KR | 20020037453 | 5/2002 |
| KR | 20050008439 | 1/2005 |
| KR | 20050021782 | 3/2005 |
| KR | 20060028463 | 3/2006 |
| KR | 20060103035 | 9/2006 |
| WO | WO-9301550 | 1/1993 |
| WO | WO-9613013 | 5/1996 |
| WO | WO-9624092 | 8/1996 |
| WO | WO-9627155 | 9/1996 |
| WO | WO-9721162 | 6/1997 |
| WO | WO-9725798 | 7/1997 |
| WO | WO-9743761 | 11/1997 |
| WO | WO-9809209 | 3/1998 |
| WO | WO-9810381 | 3/1998 |
| WO | WO-9811478 | 3/1998 |
| WO | WO-9821679 | 5/1998 |
| WO | WO-9824037 | 6/1998 |
| WO | WO-9837481 | 8/1998 |
| WO | WO-9842098 | 9/1998 |
| WO | WO-9858306 | 12/1998 |
| WO | WO-9915970 | 4/1999 |
| WO | WO-9953689 | 10/1999 |
| WO | WO-0008909 | 2/2000 |
| WO | WO-0048062 | 8/2000 |
| WO | WO-0054126 | 9/2000 |
| WO | WO-0057684 | 10/2000 |
| WO | WO-0058810 | 10/2000 |
| WO | WO-0058811 | 10/2000 |
| WO | WO-0058859 | 10/2000 |
| WO | WO-0059150 | 10/2000 |
| WO | WO-0059152 | 10/2000 |
| WO | WO-0135293 | 5/2001 |
| WO | WO-0144908 A1 | 6/2001 |
| WO | WO-0145012 | 6/2001 |
| WO | WO-0152020 A1 | 7/2001 |
| WO | WO-0152021 A1 | 7/2001 |
| WO | WO-0163512 | 8/2001 |
| WO | WO-0177795 | 10/2001 |
| WO | WO-0193461 | 12/2001 |
| WO | WO-0208969 | 1/2002 |
| WO | WO-0219598 A2 | 3/2002 |
| WO | WO-0237371 A1 | 5/2002 |
| WO | WO-02056155 | 7/2002 |
| WO | WO-02103495 | 12/2002 |
| WO | WO-03009115 | 1/2003 |
| WO | WO-03030434 | 4/2003 |
| WO | WO-03073688 | 9/2003 |
| WO | WO-03107585 | 12/2003 |
| WO | WO-03107588 | 12/2003 |
| WO | WO-2004053618 A2 | 6/2004 |
| WO | WO-2004092886 | 10/2004 |
| WO | WO-2005091757 A2 | 10/2005 |
| WO | WO-2006065012 A1 | 6/2006 |
| WO | WO-2007032974 | 3/2007 |

OTHER PUBLICATIONS

(56) References Cited

OTHER PUBLICATIONS

"Office Action Received for Canada Patent Application No. 2505295", Mailed Date: Nov. 19, 2013, Filed Date: Apr. 22, 2005, 4 Pages.
"First Examination Received for Indian Patent Application No. 892/DEL/2005", Mailed Date: Sep. 13, 2013, Filed Date: Apr. 7, 2005, 2 Pages.
"Second Examination Report Received for Indian Patent Application No. 892/DEL/2005", Mailed Date: Jan. 28, 2014, Filed Date: Apr. 7, 2005, 2 Pages.
"Notice of Allowance," mailed Feb. 2, 2015, from U.S. Appl. No. 11/227,045, 8 pages.
"International Search Report and Written Opinion mailed Jan. 16, 2006", Application No. PCT/US2006/034622, 6 pages.
"International Search Report and Written Opinion mailed Nov. 30, 2006", Application No. PCT/US05/40950, 8 pages.
Qiao, Daji et al., "MiSer: An Optimal Low-Energy Transmission Strategy for IEEE 802.11 a/h", *obtained from ACM*, (Sep. 2003),pp. 161-175.
"International Search Report and Written Opinion mailed Apr. 22, 2008", Application No. PCT/US2007/087960, 7 pages.
Eren, H. et al., "Fringe-Effect Capacitive Proximity Sensors for Tamper Proof Enclosures", *Proceedings of 2005 Sensors for Industry Conference*, (Feb. 2005),pp. 22-25.
"International Search Report and Written Opinion mailed Nov. 15, 2004", Application No. PCT/US05/40966, 9 pages.
Schneier, B. "Applied Cryptography, Second Edition: Protocols, Algorithms, and Source Code in C (cloth)", (Jan. 1, 1996),13 pages.
Goering, Richard "Web Venture Offers Metered Access to EDA Packages—Startup Winds Clocks by the Hour Tools (E*CAD Will Launch Web Site That Provides Pay-Per-Use and Pay-Per-Hour Access to Range of Chip Design Software)", *Electronic Engineering Times*, (Nov. 6, 2000),3 pages.
Zemao, Chen et al., "A Malicious Code Immune Model Based on Program Encryption", *IEEE—Wireless Communication, Networking and Mobile Computing*, WICOM '08, 4th International Conference on Oct. 12-14, 2008,5 pages.
Mufti, Dr. Muid et al., "Design and Implementation of a Secure Mobile IP Protocol", *Networking and Communication*, INCC 204, International Conference on Jun. 11-13, 2004,5 pages.
Davida, George I., et al., "UNIX Guardians: Active User Intervention in Data Protection", *Aerospace Computer Security Applications Conference*, Fourth Dec. 12-16, 1988,6 pages.
Morales, Tatiana "Understanding Your Credit Score", http://www.cbsnews.com/stories/2003/04/29/earlyshow/contributors/raymartin/main55152.shtml retrieved from the Internet on Apr. 23, 2009, (Apr. 30, 2003),3 pages.
"Achieving Peak Performance: Insights from a Global Survey on Credit Risk and Collections Practices", *GCI Group Pamphlet*, (2002, 2004),12 pages.
"Equifax Business Solutions—Manage Your Customers", Retrieved from the Internet from http://www.equifax.com/sitePages/biz/smallBiz/?sitePage=manageCustomers on Oct. 14, 2005, 3 pages.
"Prequalification Using Credit Reports", Retrieved from the Internet at http://www.credco.com/creditreports/prequalification.htm on Oct. 14, 2005, 2 pages.
Gao, Jerry et al., "Online Advertising—Taxonomy and Engineering Perspectives", http://www.engr.sjsu.edu/gaojerry/report/OnlineAdvertising%20.pdf, (2002),33 pages.
Oshiba, Takashi et al., "Personalized Advertisement-Duration Control for Streaming Delivery", *ACM Multimedia*, (2002),8 pages.
Yue, Wei T., et al., "The Reward Based Online Shopping Community", *Routledge*, vol. 10, No. 4, (Oct. 1, 2000),2 pages.
"International Search Report and Written Opinion mailed Nov. 8, 2007", Application No. PCT/US05/40967, 5 pages.
"International Search Report and Written Opinion", Application Serial No. PCT/US05/40940, 18 pages.
"International Search Report and Written Opinion mailed Apr. 25, 2007", Application No. PCT/US05/040965, 5 pages.

"International Search Report and Written Opinion mailed Sep. 25, 2006", Application No. PCT/US05/40949, 7 pages.
"EP Office Action Mailed Nov. 17, 2006", Application No. 05110697.9, 6 pages.
"EP Office Action mailed Apr. 5, 2007", Application No. 05110697.9, 5 pages.
"EP Summons to Attend Oral Proceedings mailed Sep. 27, 2007", Application No. 05110697.9, 7 pages.
"Decision to Refuse a European Application mailed Feb. 15, 2008", Application No. 05110697.9, 45 pages.
"International Search Report and Written Opinion mailed Sep. 8, 2006", Application No. PCT/US05/040942, 20 pages.
"European Search Report mailed Dec. 6, 2010", Application No. 05820177.3, 8 pages.
Lampson, Butler et al., "Authentication in Distributed Systems: Theory and Practice", *ACM Transactions on Computer Systems*, v10, 265,(1992),18 pages.
"DMOD WorkSpace OEM Unique Features", www.dmod.com/oem_features, Retrieved from the Internet on Jan. 12, 2005,3 pages.
"Notice of Rejection mailed Jun. 7, 2011", Japanese Application No. 2007-541361, 3 pages.
"Office Action mailed Jun. 29, 2009", Mexican Application No. MX/a/2007/005657, 2 pages.
"Search Report Dated Jan. 11, 2008", EP Application No. 05820090.8, 7 pages.
"Examination Report mailed Mar. 5, 2008", EP Application No. 05820090.8, 1 page.
"First Office Action mailed Apr. 11, 2008", Chinese Application No. 200580038813.9. 11 pages.
"Office Action mailed Jan. 29, 2009", Mexican Application No. MX/a/2007/005656, 6 pages.
"Office Action mailed Nov. 30, 2009", Mexican Application No. MX/a/2007/005659, 6 pages.
"Notice of Allowance mailed Jul. 2, 2010", Mexican Application No. MX/a/2007/005659, 2 pages.
"Extended European Search Report mailed Dec. 6, 2010", EP Application No. 05820177.3, 8 pages.
"Second Office Action mailed Dec. 18, 2009", Chinese Application No. 200580038812.4, 24 pages.
"Third Office Action mailed Apr. 1, 2010", Chinese Application No. 200580038812.4, 9 pages.
"Notice on Grant of Patent Right for Invention mailed May 5, 2011", Chinese Application No. 200580038812.4, 4 pages.
"Office Action mailed Jul. 7, 2009", Mexican Application No. MX/a/2007/005660, 8 pages.
"Notice of Allowance mailed Feb. 18, 2010", Mexican Application No. MX/a/2007/005660, 2 pages.
"Extended European Search Report mailed Aug. 13, 2010", EP Application No. 05823253.9, 7 pages.
"Notice on the First Office Action mailed Sep. 27, 2010", Chinese Application No. 200580038745.6, 6 pages.
"Office Action mailed Jul. 8, 2009", Mexican Application No. MX/a/2007/005662, 7 pages.
"Notice of Allowance mailed Feb. 19, 2010", Mexican Application No. MX/a/2007/005662, 2 pages.
"Partial Search Report mailed Jul. 23, 2010", EP Application No. 05821183.0.
"Extended European Search Report mailed Jan. 7, 2011", EP Application No. 05821183.0, 9 pages.
"Notice of Allowance mailed Dec. 25, 2009", Chinese Application No. 200580038773.8, 4 pages.
"Office Action mailed Jun. 26, 2009", Mexican Application No. MX/a/2007/005655, 5 pages.
"Office Action mailed Feb. 9, 2010", Mexican Application No. MX/a/2007/005855, 6 pages.
"Office Action mailed Sep. 24, 2010", Mexican Application No. MX/a/2007/005655, 3 pages.
"Extended European Search Report mailed Jan. 21, 2010", EP Application No. 05819896.1, 8 pages.
"Office Action mailed Mar. 19, 2010", EP Application No. 05819896.1, 1 page.
"Office Action mailed Feb. 10, 2010", Mexican Application No. MX/a/2007/005656, 5 pages.

(56) References Cited

OTHER PUBLICATIONS

"Office Action mailed Oct. 18, 2010", Mexican Application No. MX/a/2007/005656, 3 pages.
"Office Action mailed May 22, 2009", Chinese Application No. 200580038771.9, 5 pages.
"Notice on the First Office Action mailed Jul. 30, 2010", Chinese Application No. 200680033207.2, 7 pages.
"EP Search Report mailed Jan. 2, 2008", EP Application No. 05109616.2, 7 pages.
"Flonix: USB Desktop OS Solutions Provider, http://www.flonix.com", Retrieved from the Internet Jun. 1, 2005, (Copyright 2004),2 pages.
"Migo by PowerHouse Technologies Group, http://www.4migo.com", Retrieved from the Internet Jun. 1, 2005, (Copyright 2003),3 pages.
"WebServUSB, http://www.webservusb.com", Retrieved from the Internet Jun. 1, 2005, (Copyright 2004),16 pages.
"Notice of Rejection mailed Jul. 5, 2011", Japanese Application No. 2007-541363, 10 pages.
"Notice of Rejection mailed Aug. 5, 2011", Japanese Patent Application No. 2007-552142, 8 pages.
"Forward Solutions Unveils Industry's Most Advanced Portable Personal Computing System on USB Flash Memory Device", *Proquest, PR Newswire*, http://proquest.umi.com/pqdweb?index=20&did=408811931&SrchMode=1&sid=6&Fmt=3, Retreived from the Internet Feb. 15, 2008,(Sep. 22, 2003),3 pages.
"Office Action mailed May 26, 2008", EP Application No. 05109616.2, 5 pages.
"Notice on Division of Application mailed Aug. 8, 2008", CN Application No. 200510113398.0, (Aug. 8, 2008),2 pages.
"Notice on First Office Action mailed Dec. 12, 2008", CN Application No. 200510113398.0.
"The Second Office Action mailed Jul. 3, 2009", CN Application No. 200510113398.0, 7 pages.
"Notice on Proceeding with the Registration Formalities mailed Oct. 23, 2009", CN Application No. 200510113398.0, 4 pages.
"Examiner's First Report on Application mailed Jun. 4, 2010", AU Application No. 2005222507, 2 pages.
"Notice of Acceptance mailed Oct. 14, 2010", AU Application No. 2005222507, 3 pages.
"Decision on Grant of a Patent for Invention mailed Apr. 29, 2010", Russian Application No. 2005131911, 31 pages.
"Office Action mailed Dec. 3, 2009", Russian Application No. 2005131911.
"Notice of Allowance mailed Nov. 13, 2009", MX Application No. PA/a/2005/011088, 2 pages.
"TCG Specification Architecture Overview", Revision 1.2, (Apr. 28, 2004),55 pages.
"International Search Report and Written Opinion mailed Jun. 19, 2007", PCT Application No. PCT/US05/46091, 11 pages.
"Notice on Grant of Patent Right for Invention mailed Jan. 29, 2010", CN Application No. 200580040764.2, 4 pages.
"International Search Report mailed Jan. 5, 2007", Application No. PCT/US2006/032708, 3 pages.
"Cyotec—CyoLicence", printed from www.cyotec.com/products/cyoicence on Sep. 7, 2005, (Copyright 2003-2005).
"Magic Desktop Automation Suite for the Small and Mid-Sized Business", printed from www.remedy.com/soultions/magic_it_suite.htm on Sep. 7, 2005, (Copyright 2005),4 pages.
"PACE Anti-Piracy Introduction", printed from www.paceap.com/psintro.html on Sep. 7, 2005, (Copyright 2002),4 pages.
"Office Action mailed Jul. 6, 2009", MX Application No. MX/a/2007/005661, 6 pages.
"Office Action mailed Oct. 1, 2010", MX Application No. MX/a/2007/005661, 3 pages.
"Office Action mailed Mar. 8, 2011", MX Application No. MX/a/2007/005661, 8 pages.
"Notice on Second Office Action mailed Jun. 7, 2010", CN Application No. 200680030846.3, 6 pages.
"Decision on Rejection mailed Sep. 13, 2010", CN Application No. 200680030846.3, 5 pages.
Kwok, Sai H., "Digital Rights Management for the Online Music Business", ACM SIGecom Exhchanges, vol. 3, No. 3, (Aug. 2002),pp. 17-24.
"International Search Report and Written Opinion mailed Mar. 21, 2007", Application No. PCT/US05/46223, 10 pages.
"The First Office Action mailed Oct. 9, 2009", CN Application No. 200580043102.0, 20 pages.
"Notice of Rejection mailed Jun. 13, 2011", JP Application No. 2007-551270, 4 pages.
"International Search Report and Written Opinion mailed Jul. 9, 2008", Application No. PCT/US05/46539, 11 pages.
"Notice of the First Office Action mailed Dec. 29, 2010", CN Application No. 200580044294.7, 9 pages.
"Office Action mailed Jul. 1, 2009", MX Application No. 2007/a/2007/007441.
"European Search Report mailed Aug. 31, 2011", EP Application No. 05855148.2, 6 pages.
"International Search Report and Written Opinion mailed Sep. 25, 2007", Application No. PCT/US06/12811, 10 pages.
"Examiner's First Report mailed Sep. 15, 2009", AU Application No. 2006220489, 2 pages.
"Notice of Acceptance mailed Jan. 25, 2010", AU Application No. 2006220489, 2 pages.
"The First Office Action mailed Aug. 22, 2008", CN Application No. 200680006199.2, 23 pages.
"The Second Office Action mailed Feb. 20, 2009", CN Application No. 200680006199.2, 9 pages.
"The Fourth Office Action mailed Jan. 8, 2010", CN Application No. 200680006199.2, 10 pages.
"The Fifth Office Action mailed Jul. 14, 2010", CN Application No. 200680006199.2, 6 pages.
"Notice on Grant of Patent mailed Oct. 20, 2010", CN Application No. 200680006199.2, 4 pages.
"First Office Action mailed Aug. 21, 2009", CN Application No. 200680030846.3, 8 pages.
"Notice of Rejection mailed Jul. 12, 2011", JP Application No. 2007-541351, 4 pages.
"Notice of Rejection mailed Jul. 22, 2011", JP Application No. 2007-541362.
"Notice of Rejection mailed Jul. 15, 2011", JP Application No. 2007-541356, 4 pages.
"Notice of Rejection mailed Jul. 26, 2011", JP Application No. 2007-541352, 5 pages.
"Notice of Rejection mailed Jul. 22, 2011", JP Application No. 2007-541355, 4 pages.
"Notice on the First Office Action mailed Dec. 11, 2009", CN Application No. 200510127170.7, 16 pages.
"The Third Office Action mailed Jun. 5, 2009", CN Application No. 200680006199.2, 7 pages.
"Notice of Rejection mailed Sep. 9, 2011", JP Application No. 2007-548385, 9 pages.
"Notice of Rejection mailed Nov. 11, 2011", Japanese Application No. 2005-301957, 21 pages.
Utagawa, Mari et al., "Creation of Card Application by IC Card OS 'MULTOS' Which Can Rewrite Application", *Interface*, vol. 29, No. 3, ISSN: 0387-9569, CQ Publishing Co. Ltd., (Mar. 1, 2003),pp. 46-55.
"Extended European Search Report mailed Dec. 21, 2011", EP Application No. 05854752.2, 7 pages.
"Office Action mailed Dec. 7, 2011", JP Application No. 2008-528054, 7 pages.
"Final Rejection mailed Jan. 17, 2012", Japan Application No. 2007-552142, 8 pages.
"EP Office Action mailed Mar. 8, 2012", EP Application No. 05109616.2, 6 pages.
"Notice of Preliminary Rejection mailed May 30, 2012", Korean Patent Application No. 10-2007-7011069, 1 page.
"Extended European Search Report mailed Jul. 5, 2012", EP Application No. 05851550.3, 6 pages.
"Preliminary Rejection mailed Jul. 4, 2012", Korean Application No. 10-2007-7012294, 2 pages.

(56) References Cited

OTHER PUBLICATIONS

"Office Action mailed Jun. 8, 2012", JP Application No. 2005-301957, 8 pages.
Nakajima, S. "Do You Really Know It? Basics of Windows2000/XP Network, 4th Installment, What is Logon Like?", *Nikkei Business Publications, Inc.*, (Jan. 2004),pp. 116-121.
"First Special Feature, Security Oriented Web Application Development, Part 3, Method for Realizing Secure Session Management", *N+1 Network Guide* (vol. 4, No. 1, Serial No. 32) Softbank Publishing Inc., (Jan. 2004),pp. 47-59.
Final Office Action mailed Nov. 10, 2009, from U.S. Appl. No. 11/006,837. 25 Pages.
Final Office Action mailed Nov. 18, 2008, from U.S. Appl. No. 11/152,214. 17 Pages.
Final Office Action mailed Nov. 18, 2010, from U.S. Appl. No. 11/006,837. 22 Pages.
Final Office Action mailed Nov. 7, 2005, from U.S. Appl. No. 09/290,363. 8 Pages.
Final Rejection and English translation mailed Jul. 5, 2012, from Korean Patent Application No. 10-1213807. 5 Pages.
Final Rejection mailed Feb. 7, 2011, from U.S. Appl. No. 11/152,214. 15 Pages.
Final Rejection mailed Jan. 17, 2012, from Japanese Patent Application No. 5173436. 8 Pages.
First Examination Report mailed Dec. 15, 2014, from Indian Patent Application No. 4041/DELNP/2007. 2 Pages.
First Examination Report mailed Feb. 6, 2015, from Indian Patent Application No. 3407/DELNP/2007. 2 Pages.
First Examination Report mailed Mar. 31, 2015, from Indian Patent Application No. 3408/DEL/2007. 2 Pages.
First Examination Report mailed Nov. 20, 2014, from Indian Patent Application No. 3039/DEL/2005. 2 Pages.
First Examination Report mailed Nov. 5, 2014, from Indian Patent Application No. 3411/DELNP/2007 2 Pages.
First Examination Report mailed Nov. 6, 2014, from Indian Patent Application No. 3418/DELNP/2007. 1 Page.
First Examination Report mailed Oct. 27, 2014, from Indian Patent Application No. 3406/DELNP/2007. 1 Page.
First Examination Report mailed Oct. 31, 2014, from Indian Patent Application No. 3410/DELNP/2007. 2 Pages.
First Examination Report mailed Sep. 19, 2014, from Indian Patent Application No. 2739/DELNP/2005. 1 Page.
First Office Action mailed Apr. 11, 2008, from Chinese Patent Application No. 200580038813.9. 11 Pages.
First Office Action mailed Aug. 21, 2009, from Chinese Patent Application No. 200680030846.3. 8 Pages.
First Office Action mailed Dec. 12, 2008, from Chinese Patent Application No. 2005-10113398.0. 15 Pages.
First Office Action mailed Dec. 29, 2010, from Chinese Patent Application No. 200580044294.7. 9 Pages.
First Office Action mailed Nov. 30, 2007, from Chinese Patent Application No. 200510066707.3. 8 Pages.
International Search Report and Written Opinion mailed Aug. 2, 2007, from PCT Patent Application No. PCT/US05/30489. 9 Pages.
International Search Report and Written Opinion mailed May 2, 2008, from PCT Patent Application No. PCT/US05/40940. 12 Pages.
International Search Report and Written Opinion mailed Oct. 23, 2007, from PCT Patent Application No. PCT/US06/10664. 9 Pages.
International Search Report and Written Opinion mailed Sep. 29, 2008, from PCT Patent Application No. PCT/US05/40940. 11 Pages.
International Search Report mailed Dec. 26, 2008, from PCT Patent Application No. PCT/US2008/067466. 4 Pages.
International Search Report mailed Jul. 22, 2002, from PCT Patent Application No. PCT/US00/04949. 4 Pages.
International Search Report mailed Jul. 24, 2002, from PCT Patent Application No. PCT/US00/04946. 5 Pages.
International Search Report mailed Jul. 24, 2002, from PCT Patent Application No. PCT/US00/04948. 5 Pages.
Office Action mailed Jun. 3, 2015, from European Patent Application No. 05855148.2. 5 Pages.

Response filed Feb. 12, 2010 to Non-Final Office Action dated Apr. 10, 2009, from U.S. Appl. No. 11/006,837. 16 Pages.
Response filed Feb. 13, 2012 and English translation of claims as filed, from Japanese Patent Application No. 2005-301957. 9 Pages.
Response filed Feb. 27, 2014 to Non-Final Office Action dated Dec. 5, 2013, from U.S. Appl. No. 13/711,549. 10 Pages.
Response filed Jan. 13, 2011 to Final Office Action dated Nov. 18, 2010, from U.S. Appl. No. 11/006,837. 11 Pages.
Response filed Jan. 21, 2011 to Non-Final Office Action dated Jul. 21, 2010, from U.S. Appl. No. 11/147,539. 10 Pages.
Response filed Jan. 28, 2015, from Indian Patent Application No. 2739/DEL/2005. 20 Pages.
Response filed Jan. 30, 2013 to Non-Final Office Action dated Oct. 3, 2012, from U.S. Appl. No. 11/227,045. 13 Pages.
Response filed Jan. 31, 2011 to Final Office Action dated Jul. 30, 2010, from U.S. Appl. No. 11/224,635. 9 Pages.
Response filed Jan. 5, 2010, from Chinese Patent Application No. 200680030846.3. 11 Pages.
Response filed Jan. 7, 2008, from European Patent Application No. 05110697.9. 6 Pages.
Response filed Jan. 8, 2007 to Non-Final Office Action dated Oct. 5, 2006, from U.S. Appl. No. 11/022,493. 17 Pages.
Response filed Jul. 2, 2007, to Final Office Action dated Mar. 30, 2007, from U.S. Appl. No. 11/022,493. 7 Pages.
Response filed Jul. 21, 2009 to Non-Final Office Action dated Apr. 10, 2009, from U.S. Appl. No. 11/006,837. 14 Pages.
Response filed Jul. 23, 2010 to Final Office Action dated Apr. 1, 2010, from U.S. Appl. No. 11/227,045. 12 Pages.
Response filed Jun. 23, 2010 to Non-Final Office Action dated Mar. 23, 2010, from U.S. Appl. No. 11/224,635. 5 Pages.
Response filed Jun. 28, 2011 to Non-Final Office Action dated Apr. 21, 2011, from U.S. Appl. No. 11/224,635. 10 Pages.
Response filed Jun. 29, 2011 to Final Office Action dated Apr. 1, 2011, from U.S. Appl. No. 11/147,539. 11 Pages.
Response filed Mar. 11, 2010, from Chinese Patent Application No. ZL200680006199.2. 7 Pages.
Response filed Mar. 12, 2012 to Non-Final Office Action dated Dec. 12, 2011, from U.S. Appl. No. 10/988,907. 11 Pages.
Response filed Mar. 13, 2008 to Non-Final Office Action dated Nov. 14, 2007, from U.S. Appl. No. 11/022,493. 8 Pages.
Response filed Mar. 19, 2007, from European Patent Application No. 05110697.9. 7 Pages.
Response filed Mar. 19, 2010 to Non-Final Office Action dated Jan. 27, 2010, from U.S. Appl. No. 11/022,493. 4 Pages.
Response filed Mar. 6, 2012, from Japanese Patent Application No. 2008-528054. 7 Pages.
Response filed Mar. 9, 2011 to Final Office Action dated Dec. 9, 2010, from U.S. Appl. No. 10/988,907. 9 Pages.
Response filed May 18, 2009 to Final Office Action dated Nov. 18, 2008, from U.S. Appl. No. 11/152,214. 7 Pages.
Response filed May 18, 2011 to Non-Final Office Action dated Mar. 17, 2011, from U.S. Appl. No. 11/022,493. 10 Pages.
Response filed May 19, 2010, from European Patent Application No. 5819896.1. 4 pages.
Response filed May 22, 2009 to Non-Final Office Action dated Feb. 18, 2009, from U.S. Appl. No. 11/147,539. 13 Pages.
Response filed May 25, 2010 to Non-Final Office Action dated Mar. 4, 2010, from U.S. Appl. No. 10/988,907. 7 Pages.
Response filed May 5, 2015, from Indian Patent Application No. 3406/DELNP/2007. 12 Pages.
Linn, "Privacy Enhancement for Internet Electronic Mail: Part I: Message Encryption and Authentication Procedures", Network Working Group, RFC 1421, pp. 1-37, (Feb. 1993), retrieved on Apr. 19, 2012, 37 pages.
Linn, "Copyright and Information Services in the Context of the National Research and Educational Network", IMA Intel. Property Project Proceedings, 1(1), 1 and 10-20, (Jan 1994), 13 pages.
Lotspiech, "Broadcast Encryption's Bright Future", IEEE Computer, Aug. 2002, pp. 57-63, 7 pages.
Malamud, "Network-Based Authentication: The Key to Security", Network Computing, pp. 98-100, (Jun. 1991), 3 pages.
McNab, "Super-Distribution Works Better in Practical Applications", (Mar. 2, 1998), 2 pages.

(56) References Cited

OTHER PUBLICATIONS

Memon, et al., "Protecting Digital Media Content", Communications of the ACM, Jul. 2002, pp. 35-43, 9 pages.
Menezes, et al., "Handbook of Applied Cryptography", 1997, CRC Press, pp. 31-32, 2 pages.
Moeller, "IBM Takes Charge of E-Commerce", Plans Client, Servers Apps based on SET, Apr. 1996, 5 pages.
Moeller, "NetTrust Lets Cyberspace Merchants Take Account", PC Week, 12(48), Nov. 20, 1995, 1 page.
Mois, et al., "Reconfiguration Security for Hardware Agents in Testing", 2010 IEEE International Conference on Automation Quality and Testing Robotics (AQTR), vol. 2, (2010), 5 pages.
Oda, "The Basics and Application of Security IC Cards—Passport to an E-Business", 1st ed., C. Media Co., Ltd., (Apr. 27, 2000), 16 pages.
Ogata, et al., "Provably Secure Metering Scheme", Advances in Cryptology_ASIACRYPT, 6th International Conference on the Theory and Application of Cryptology and Information Security Proceedings, (Lecture notes in Computer Science 1976), 2000, pp. 388-398, 11 pages.
Oh, et al., "Acceleration Technique for vol. Rendering Using 2D Texture Based Ray Plane Casting on GPU", 2006 Intl. Conf. CIS, Nov. 3-6 2006, pp. 1755-1758, 4 pages.
Olson, et al., "Concurrent Access Licensing", pp. 67-74, UNIX Review, vol. 6, No. 9, (Sep. 1988), 6 pages.
Ooi, et al., "A Proof of Concept on Defending Cold Boot Attack", Quality Electronic Design, ASQED 2009, 1st Asia Symposium, pp. 330-335, 6 pages.
Peinado, "Digital Rights Management in a Multimedia Environment", SMPTE Journal, 2002, 111(3), pp. 159-163, 6 pages.
Pemberton, "An Online Interview with Jeff Crigler at IBM InfoMarket", Jul. 1996, 8 pages.
Pruneda, "Using Windows Media Rights Manager to Protect and Distribute Digital Media", Windows Media Technologies, http://msdn.microsoft/msdnmag/issues/01/12/DRM/print.asp, (Dec. 1, 2001), 18 pages.
Pruneda, "Windows Media Technologies: Using Windows Media Rights Manager to Protect and Distribute Digital Media", MSDN Magazine Japanese Version, ASCII Corporation, Japan, No. 22, Jan. 18, 2002, 15 pages.
Ramanujapuram, et al., "Digital Content & Intellectual Property Rights: a Specification Language and Tools for Rights Management", Dec. 1998, 6 pages.
Ripley, et al., "Content Protection in the Digital Home", Intel Technology Journal, Nov. 2002, vol. 6, No. 4, pp. 49-56, 8 pages.
Rouvroy, et al., "Reconfigurable Hardware Solutions for the Digital Rights Management of Digital Cinema", Proceedings of the 4th ACM Workshop on Digital Rights Management, (Oct. 2004), pp. 40-53, 2 pages.
Royan, "Content Creation and Rights Management: Experiences of SCRAN", Program, 2000, 34(2), 10 pages.
Schneier, "Applied Cryptography Passage", Applied Crytography, Protocols, Algorithms and Source Code in C, 1996, pp. 183-187, retrieved Jun. 19, 2008, 13 pages.
Seok Kim, et al., "A Secure and Efficient Metering Scheme for Internet Advertising", Journal of KISS: Computer Systems and Theory, 2002, 29(3-4), pp. 153-160, 8 pages.
Shi, et al., "A Fast MPEG Video Encryption Algorithm", ACM Multimedia, 1998, Bristol, UK, pp. 81-88, 8 pages.
Sibert, et al., "Securing the Content, Not the Wire, for Information Commerce", pp. 1-12, Jul. 1995, 14 pages.
Sibert, et al., "The DigiBox: A Self-Protecting Container for Information Commerce", First USENIX Workshop on Electronic Commerce, pp. 171-183, Jul. 11-12, 1995, 14 pages.
Slusallek, et al., "Vision-An Architecture for Global Illumination Calculation", IEEE Transactions on Visualization and Computer Graphics, vol. 1, No. 1, Mar. 1995, pp. 77-96, 20 pages.
Smith, et al., "A New Set of Rules for Information Commerce", Electronic Commerce, pp. 34-35, Nov. 6, 1995, 2 pages.

Blissmer, R., "Next Step is Encryption: Data Security May be Bundled with Next's Operating System", Electronic Engineering Times, (Feb. 3, 1992), 2 pages.
Bloom, et al., "Copy Protection for DVD Video", Proceedings of the IEEE, vol. 87, No. 7, Jul. 1999, 11 pages.
Cassidy, "A Web Developers Guide to Content Encapsulation Technology", Netscape World, (Apr. 1997), 7 pages.
Chin, T., "Reaching Out to Physicians", Health Data Management, vol. 6, No. 9, pp. 36, 38, 40, (Sep. 1998), 3 pages.
Clark, T., "Software Secures Digital Content on Web", Interactive Week, (Sep. 25, 1995), 1 page.
Cox, B., "Superdistribution", Wired Magazine, Idea Fortes, (Sep. 1994), 5 pages.
Cox, B. "What If There is a Silver Bullet", J. Object Oriented Program, (Jun. 1992), 5 pages.
Dawson, F., "S-A Unveil Security System", Multichannel News, Broadband Week, vol. 18, No. 3, pp. 45 & 47, (Jan. 15, 1996), 2 pages.
Evans, P., "DRM: Is the Road to Adoption Fraught with Potholes?", Seybold Reporting Analyzing Publishing Technologies, Oct. 22, 2001, 1(14), p. 32, 2 pages.
Finnie, et al., "Suppliers Cashing in on the Internet", Communications Week International, n. 134, pp. 36-37, (Nov. 14, 1994), 2 pages.
Fowler, T., "Technology's Changing Role in Intellectual Property Rights", IT Professional (IEEE), Mar./Apr. 2002, 4(2), 39-44, 6 pages.
Gable, J., "The Digital Rights Conundrum", Transform Magazine, 2001, 10(11), 27, 2 pages.
Griswold, G.N., "A Method for Protecting Copyright on Networks", IMA Intellectual Property Project Proceedings, vol. 1, Issue 1, pp. 111-120., (Jan. 1994), 11 pages.
Gunter, et al., "Models and Languages for Digital Rights", Proceedings of the 34th Annual Hawaii International Conference on System Sciences, 2001, 5 pages.
Hanai, H., "Latest Information and Establishment of a Server-Setting Up Free", BSD-UNIX User, vol. 11, No. 3, Softbank Pub. Co, Japan, (Mar. 1, 2002), 15 pages.
Hauser, R., "Does Licensing Require New Access Control Techniques?", Communications of the ACM, vol. 37, No. 11, (Nov. 1994), 8 pages.
Hong, et al., "On the Construction of a Powerful Distributed Authentication Server Without Additional Key Management", Computer Communications, 2000, 23, 8 pages.
Housley, et al., "Internet X. 509 Public Key Infrastructure Certificate and Certificate Revocation List (CRL) Profile", Standards Track, (Apr. 2002), pp. 1-129, retrieved on Apr. 19, 2012, 129 pages.
Housley, et al., "Metering: A Pre-Pay Technique", Proceedings of the SPIE-The International Society for Optical Engineering, 3022, (Feb. 13, 1997), p. 527, 2 pages.
Hudgins-Bonafield, C., "Selling Knowledge on the Net", Network Computing, pp. 102-109, (Jun. 1, 1995), 5 pages.
Hwang, et al., "Protection of Digital Contents on Distributed Multimedia Environment", Proceedings of the IASTED International Conference and Multimedia Systems and Apps, Nov. 19-23, 2000, Las Vegas, NV, pp. 127-132, 5 pages.
Jakobsson, et al., "Proprietary Certificates", Topics in Cryptology, 2002, pp. 164-181, 18 pages.
Kahn, R., "Deposit, Registration, and Recordation in an Electronic Copyright Management System", IMA Intellectual Property Project Proceedings, (Jan. 1994), 6 pages.
Kaliski, "Privacy Enhancement for Internet Electronic Mail: Part IV: Key Certification and Related Services", Network Working Group, RFC 1424, pp. 1-9, (Feb. 1993), 9 pages.
Kaplan, M., "IBM Cryptolopes", Super-Distribution and Digital Rights Management, (Dec. 1996), 8 pages.
Kent, S., "Protecting Externally Supplied Software in Small Computers", 1-42 and 250-252, (Sep. 1980), 256 pages.
Kohl, et al., "Safeguarding Digital Library Contents and Users: Protecting Documents Rather Than Channels", D-Lib Magazine, (Sep. 1997), 10 pages.
Kopeikin, R., "Secure Trading on the Net", Telecommunications International Edition, vol. 30, No. 10, pp. 89-94, (Oct. 1996), 4 pages.

(56) References Cited

OTHER PUBLICATIONS

Kuan-Ting, S., "A New Digital Watermarking Technique for Video", Proceedings Visual 2002, Hsin Chu, Taiwan, Mar. 11-13, 2002, 2 pages.
Kumik, P., "Digital Rights Management", Computers and Law, 2000, 11(4), pp. 14-15, 2 pages.
Examiner Interview Summary Record mailed Jul. 25, 2008, from U.S. Appl. No. 11/152,214. 2 Pages.
Examiner Interview Summary Record mailed Jul. 29, 2010, from U.S. Appl. No. 11/227,045. 3 Pages.
Examiner Interview Summary Record mailed Jul. 31, 2009, from U.S. Appl. No. 11/224,635. 2 Pages.
Examiner Interview Summary Record mailed Jun. 21, 2011, from U.S. Appl. No. 11/224,635. 3 Pages.
Examiner Interview Summary Record mailed Jun. 30, 2011, from U.S. Appl. No. 11/147,539. 5 Pages.
Examiner Interview Summary Record mailed Mar. 28, 2011, from U.S. Appl. No. 11/152,214. 4 Pages.
Examiner Interview Summary Record mailed Mar. 7, 2011, from U.S. Appl. No. 11/006,837. 3 Pages.
Examiner Interview Summary Record mailed May 10, 2011, from U.S. Appl. No. 11/022,493. 4 Pages.
Examiner's First Report mailed Jun. 7, 2010, from Australian Patent Application No. 2005222507. 2 Pages.
Examiner's First Report mailed Sep. 15, 2009, from Australian Patent Application No. 2006220489. 2 Pages.
Extended European Search Report mailed Aug. 31, 2011, from European Patent Application No. 05855148.2. 6 Pages.
Extended European Search Report mailed Dec. 21, 2011, from European Patent Application No. 05854752.2. 7 Pages.
Extended Search Report mailed Dec. 6, 2010, from European Patent Application No. 051820177.3. 8 Pages.
Extended Search Report mailed Jan. 2, 2008, from European Patent Application No. 05109616.2. 7 Pages.
Extended Search Report mailed Jan. 21, 2010, from European Patent Application No. 05819896.1. 8 Pages.
Extended Search Report mailed Jan. 7, 2011, from European Patent Application No. 05821183.0. 9 Pages.
File Wrapper Prosecution of U.S. Appl. No. 11/021,021, filed Dec. 23, 2004. 58 Pages.
Final Notice of Rejection mailed Jun. 8, 2012, from Japanese Patent Application No. 2005-301957. 17 Pages.
Final Office Action mailed Apr. 1, 2010, from U.S. Appl. No. 11/227,045. 14 Pages.
Final Office Action mailed Sep. 29, 2009, from U.S. Appl. No. 11/224,635. 9 Pages.
Final Office Action mailed Apr. 1, 2011, from U.S. Appl. No. 11/147,539. 29 Pages.
Final Office Action mailed Aug. 10, 2011, from U.S. Appl. No. 11/022,493. 18 Pages.
Final Office Action mailed Dec. 9, 2010, from U.S. Appl. No. 10/988,907. 7 Pages.
Final Office Action mailed Jan. 24, 2014, from Chinese Patent Application No. 200580044294.7. 9 Pages.
Final Office Action mailed Jul. 30, 2010, from U.S. Appl. No. 11/224,635. 11 Pages.
Final Office Action mailed Jul. 6, 2009, from U.S. Appl. No. 11/147,539. 25 Pages.
Final Office Action mailed Jun. 11, 2008, from U.S. Appl. No. 11/022,493. 13 Pages.
Final Office Action mailed Jun. 18, 2010, from U.S. Appl. No. 11/022,493. 14 Pages.
Final Office Action mailed Mar. 30, 2007, from U.S. Appl. No. 11/022,493. 10 Pages.
Final Office Action mailed May 11, 2010, from U.S. Appl. No. 11/152,214. 24 Pages.
Advisory Action mailed Dec. 1, 2009, from U.S. Appl. No. 11/147,539. 3 Pages.
Advisory Action mailed Jan. 12, 2010, from U.S. Appl. No. 11/224,635. 2 Pages.
Advisory Action mailed Jan. 31, 2011, from U.S. Appl. No. 11/006,837. 3 Pages.
Advisory Action mailed Jul. 12, 2007, from U.S. Appl. No. 11/022,493. 3 Pages.
Advisory Action mailed Mar. 1, 2010, from U.S. Appl. No. 11/006,837. 3 Pages.
Amendment After Allowance filed Mar. 4, 2013, from U.S. Appl. No. 11/022,493. 6 Pages.
Amendment and Argument filed Sep. 10, 2012, from Japanese Patent Application No. 2005-301957. 9 Pages.
Amendment filed Nov. 12, 2008, in Japanese Patent Application No. 2007-541361. 4 Pages.
Amendment, Response, Claims and English Translation as filed Apr. 20, 2012, in Korean Patent Application No. 10-1201095. 28 Pages.
Amendment, Response, Claims and English Translation as filed Aug. 6, 2012, from Korean Patent Application No. 10-1213882. 18 Pages.
Applicant Initiated Interview Summary mailed Mar. 27, 2013, from U.S. Appl. No. 11/227,045. 3 Pages.
Applicant Initiated Interview Summary mailed Jan. 29, 2013, from U.S. Appl. No. 11/227,045. 2 Pages.
Applicant Initiated Interview Summary mailed Nov. 18, 2011, from U.S. Appl. No. 11/022,493. 3 Pages.
Applicants Summary of Interview filed Mar. 1, 2011, from U.S. Appl. No. 11/006,837. 1 Page.
Argument and Amendment filed Sep. 6, 2011, from Japanese Patent Application No. 2005-330496. 6 Pages.
Argument and Claims as filed Nov. 4, 2011, from Japanese Patent Application No. 5173436. 7 Pages.
Argument, Amendment and Claims as filed Nov. 21, 2012, from Japanese Patent Application No. 5173436. 2 Pages.
Comments in Preparation of Oral Hearing filed Jan. 16, 2008, from European Patent Application No. 05110697.9. 24 Pages.
Decision on Grant of Patent mailed May 5, 2010, from Russian Patent Application No. 2005131911. 7 Pages.
Decision on Rejection mailed Sep. 13, 2010, from Chinese Patent Application No. 200680030846.3. 5 Pages.
Decision to Refuse mailed Feb. 15, 2008, from European Patent Application No. 05110697.9. 45 Pages.
European Search Report mailed Oct. 13, 2006, from European Patent Application No. for 05102765.4. 3 Pages.
Examination Report mailed Apr. 5, 2007, from European Patent Application No. 05110697. 5 Pages.
Examination Report mailed Jan. 4, 2013, from Canadian Patent Application No. 2597231, 4 Pages.
Examination Report mailed Nov. 17, 2006, from European Patent Application No. 05110697.9. 6 Pages.
Examiner Initiated Interview Summary mailed Sep. 30, 2013, from U.S. Appl. No. 11/227,045. 1 Page.
Examiner Interview Summary Record dated Aug. 10, 2011, from U.S. Appl. No. 11/152,214. 4 Pages.
Examiner Interview Summary Record mailed Dec. 20, 2006, from U.S. Appl. No. 11/022,493. 3 Pages.
Examiner Interview Summary Record mailed Dec. 24, 2009, from U.S. Appl. No. 11/227,045. 3 Pages.
Examiner Interview Summary Record mailed Jan. 23, 2008, from U.S. Appl. No. 11/022,493. 3 Pages.
Response filed May 6, 2011, to Final Office Action dated Feb. 7, 2011, from U.S. Appl. No. 11/152,214. 11 Pages.
Response filed Nov. 10, 2011, to Final Office Action dated Aug. 10, 2011, from U.S. Appl. No. 11/022,493. 11 Pages.
Response filed Nov. 14, 2013, to Non-Final Office Action dated Jul. 23, 2013, from U.S. Appl. No. 13/711,549. 10 Pages.
Response filed Nov. 29, 2013, from European Patent Application No. 05855148.2. 15 Pages.
Response filed Nov. 5, 2009, to Final Office Action dated Jul. 6, 2009, from U.S. Appl. No. 11/147,539. 12 Pages.
Response filed Nov. 7, 2008, to Final Office Action dated Jun. 11, 2008, from U.S. Appl. No. 11/022,493. 17 Pages.
Response filed Oct. 20, 2009, to Non-Final Office Action dated May 27, 2009, from U.S. Appl. No. 11/022,493. 5 Pages.
Response filed Oct. 6, 2011, from Japanese Patent Application No. 2007-541363. 9 Pages.

(56) References Cited

OTHER PUBLICATIONS

Response filed Sep. 13, 2010, to Non-Final Office Action dated May 12, 2010, from U.S. Appl. No. 11/006,837. 12 Pages.
Response filed Sep. 19, 2011, to Non-Final Office Action dated Sep. 1, 2011, from U.S. Appl. No. 11/147,539. 9 Pages.
Response filed Sep. 22, 2010, to Non-Final Office Action dated Aug. 5, 2010, from U.S. Appl. No. 10/988,907. 8 Pages.
Response filed Sep. 22, 2010, from European Patent Application No. 05855148.2. 1 Page.
Response filed Sep. 27, 2010, from Australian Patent Application No. 2005222507. 44 Pages.
Response filed Sep. 6, 2011, to Non-Final Office Action dated Jun. 9, 2011, from U.S. Appl. No. 11/152,214. 13 Pages.
Response to EPO Official Communication filed Jul. 10, 2012, from European Patent Application No. 5854752.2. 15 Pages.
Response to First Office Action filed Apr. 10, 2009, from Chinese Patent Application No. 2005-10113398.0. 20 Pages.
Response to First Office Action filed Apr. 15, 2008, from Chinese Patent Application No. 200510066707.3. 52 pages.
Response to First Office Action filed Apr. 28, 2011, from Chinese Patent Application No. 200580044294.7. 15 Pages.
Response to Notice of Divisional filed Oct. 8, 2008, from Chinese Patent Application No. 2005-10113398.0. 30 Pages.
Response to Office Action filed May 20, 2014, from Canadian Patent Application No. 2505295. 10 Pages.
Response to Office Action filed May 26, 2008, from European Patent Application No. 05102765.4. 20 Pages.
Response to Partial Search Report filed Oct. 4, 2010, from European Patent Application No. 051820177.3. 2 Pages.
Response to Partial Search Report filed Oct. 4, 2010, from European Patent Application No. 0521183.0. 2 Pages.
Response to Restriction Requirement filed Apr. 16, 2009, from U.S. Appl. No. 11/224,635. 1 Page.
Response to Restriction Requirement filed Feb. 23, 2009, from U.S. Appl. No. 11/022,493. 1 Page.
Response to Second Office Action filed May 6, 2013, from Chinese Patent Application No. 200580044294.7. 5 Pages.
Response to Second Office Action filed Sep. 1, 2009, from Chinese Patent Application No. 2005-10113398.0. 34 Pages.
Response to Third Office Action filed Nov. 13, 2013, from Chinese Patent Application No. 200580044294.7. 13 Pages.
Response, Amendment, Translation of the Response, and Claims filed Feb. 21, 2013, from Korean Patent Application No. 10-2007-7013731. 7 Pages.
First Examination Report mailed Jun. 29, 2015 from Indian Patent Application No. 5036/DELNP/2007, 2 pages.
Response filed Jul. 7, 2015 from Indian Patent Application No. 3408/DELNP/2007, 23 pages.
Notice of Allowance and Examiner Initiated Interview Summary mailed Aug. 31, 2015 from U.S. Appl. No. 13/711,549, 14 pages.
Response filed Sep. 9, 2015 from the Indian Patent Application No. 3407/DELNP/2007, 20 pages.
Response filed Sep. 30, 2015 from Indian Patent Application No. 4041/DELNP/2007, 16 pages.
Office Action mailed Nov. 19, 2013, from Canadian Patent Application No. 2505295, 4 Pages.
Office Action mailed Oct. 30, 2009, from Russian Patent Application No. 2005131911. 7 Pages.
Office Action mailed Oct. 9, 2009, from Chinese Patent Application No. 200580043102.0. 20 Pages.
Official Action mailed Jul. 15, 2010, from European Patent Application No. 05855148.2. 2 Pages.
Partial Search Report mailed Jul. 23, 2010, from European Patent Application No. 05820177.3. 3 Pages.
Partial Search Report mailed Jul. 23, 2010, from European Patent Application No. 05821183.0. 3 Pages.
Pre-appeal Examination mailed Jun. 12, 2012, from Japanese Patent Application No. 5173436. 2 Pages.
Preliminary Amendment filed Dec. 11, 2012, from U.S. Appl. No. 13/711,549. 5 Pages.
Preliminary Amendment filed Dec. 24, 2014, from U.S. Appl. No. 13/711,549. 8 Pages.
Preliminary Amendment filed Nov. 14, 2005, from U.S. Appl. No. 11/224,635. 6 Pages.
Preliminary Amendment filed Nov. 3, 2005, from U.S. Appl. No. 11/227,045. 4 Pages.
Prosecution File Wrapper of U.S. Appl. No. 10/966,428, filed Oct. 15, 2004. 79 Pages.
Prosecution File Wrapper of U.S. Appl. No. 10/968,462, filed Oct. 18, 2004. 35 Pages.
Prosecution File Wrapper of U.S. Appl. No. 10/982,941, filed Nov. 4, 2004. 95 Pages.
Prosecution File Wrapper of U.S. Appl. No. 10/982,962, filed Nov. 3, 2004. 70 Pages.
Prosecution File Wrapper of U.S. Appl. No. 10/989,122, filed Nov. 15, 2004. 169 Pages.
Prosecution File Wrapper of U.S. Appl. No. 11/007,089, filed Dec. 8, 2004. 134 Pages.
Prosecution File Wrapper of U.S. Appl. No. 11/018,095, filed Dec. 20, 2004. 210 Pages.
Prosecution File Wrapper of U.S. Appl. No. 11/020,329, filed Dec. 22, 2004. 44 Pages.
Prosecution File Wrapper of U.S. Appl. No. 11/034,377, filed Jan. 12, 2005. 156 Pages.
Prosecution File Wrapper of U.S. Appl. No. 11/039,165, filed Jan. 19, 2005. 120 Pages.
Prosecution File Wrapper of U.S. Appl. No. 11/040,968, filed Jan. 21, 2005. 153 Pages.
Prosecution File Wrapper of U.S. Appl. No. 11/057,266, filed Feb. 14, 2005. 26 Pages.
Prosecution File Wrapper of U.S. Appl. No. 11/074,500, filed Mar. 8, 2005. 48 Pages.
Prosecution File Wrapper of U.S. Appl. No. 11/074,558, filed Mar. 8, 2005. 86 Pages.
Prosecution File Wrapper of U.S. Appl. No. 11/087,263, filed Mar. 23, 2005, 104 Pages.
Prosecution File Wrapper of U.S. Appl. No. 11/092,041, filed Mar. 29, 2005. 62 Pages.
Prosecution File Wrapper of U.S. Appl. No. 11/109,438, filed Apr. 19, 2005. 34 Pages.
Prosecution File Wrapper of U.S. Appl. No. 11/191,448, filed Jul. 28, 2005. 147 Pages.
Notice of Allowance and allowed claims mailed Jun. 12, 2013, from Korean Patent Application No. 10-2007-7013731. 5 Pages.
Notice of Allowance mailed Apr. 2, 2012, from U.S. Appl. No. 11/224,635. 7 Pages.
Notice of Allowance mailed Apr. 20, 2012, from U.S. Appl. No. 11/022,493. 8 Pages.
Notice of Allowance mailed Apr. 24, 2013, from U.S. Appl. No. 11/022,493. 8 Pages.
Notice of Allowance mailed Apr. 4, 2012, from U.S. Appl. No. 11/152,241. 8 Pages.
Notice of Allowance mailed Aug. 21, 2012, from U.S. Appl. No. 11/224,635. 7 Pages.
Notice of Allowance mailed Dec. 25, 2009, from Chinese Patent Application No. 200580038773.8. 4 Pages.
Notice of Allowance mailed Dec. 29, 2011, from U.S. Appl. No. 11/022,493. 9 Pages.
Notice of Allowance mailed Feb. 28, 2012, from Japanese Patent Application No. 2007-548385. 6 Pages.
Notice of Allowance mailed Jan. 22, 2013, from U.S. Appl. No. 11/022,493. 8 Pages.
Notice of Allowance mailed Jan. 24, 2012, from U.S. Appl. No. 11/147,539. 8 Pages.
Notice of Allowance mailed Jan. 29, 2010, from Chinese Patent Application No. 200580040764.2. 4 Pages.
Notice of Allowance mailed Jan. 29, 2015, from U.S. Appl. No. 13/711,549. 8 Pages.
Notice of Allowance mailed Jul. 20, 2012, from U.S. Appl. No. 11/022,493. 8 Pages.
Notice of Allowance mailed Jun. 6, 2014, from U.S. Appl. No. 11/227,045. 9 Pages.

(56) References Cited

OTHER PUBLICATIONS

Notice of Allowance mailed Mar. 29, 2013, from U.S. Appl. No. 11/227,045. 15 Pages.
Notice of Allowance mailed Mar. 27, 2012, from Japanese Patent Application No. 2008-528054, 3 Pages.
Notice of Allowance mailed May 23, 2012, from U.S. Appl. No. 11/147,539. 9 Pages.
Notice of Allowance mailed May 29, 2013, from U.S. Appl. No. 11/227,045. 6 Pages.
Notice of Allowance mailed May 7, 2013, from Canadian Patent Application No. 2597231, 1 Page.
Notice of Allowance mailed Nov. 2, 2011, from U.S. Appl. No. 11/152,241. 10 Pages.
Notice of Allowance mailed Nov. 21, 2012, and English translation of claims on file, from Korean Patent Application No. 10-1213807. 4 Pages.
Notice of Allowance mailed Nov. 25, 2011, from U.S. Appl. No. 11/022,493. 11 Pages.
Notice of Allowance mailed Oct. 23, 2009, from Chinese Patent Application No. 2005-10113398.0. 4 Pages.
Notice of Allowance mailed Oct. 23, 2012, from U.S. Appl. No. 11/022,493. 7 Pages.
Notice of Allowance mailed Sep. 12, 2011, from U.S. Appl. No. 11/224,635. 8 Pages.
Notice of Allowance mailed Sep. 7, 2012, from U.S. Appl. No. 11/147,539. 9 Pages.
Notice of Allowance mailed Feb. 2, 2015, from U.S. Appl. No. 11/227,045. 8 Pages.
Notice of Allowance mailed Mar. 27, 2012, from Japanese Patent Application No. 2008-528054. 3 Pages.
Notice of Allowance mailed May 25, 2012, from U.S. Appl. No. 10/988,907. 8 Pages.
International Search Report mailed Jul. 26, 2002, from PCT Patent Application No. PCT/US00/05091. 5 Pages.
International Search Report mailed Jul. 30, 2002, from PCT Patent Application No. PCT/US00/04983. 5 Pages.
International Search Report mailed Sep. 18, 2007, from PCT Patent Application No. PCT/US05/30490. 3 Pages.
Non-Final Office Action mailed Apr. 10, 2009, from U.S. Appl. No. 11/006,837. 19 Pages.
Non-Final Office Action mailed Apr. 15, 2008, from U.S. Appl. No. 11/152,214. 15 Pages.
Non-Final Office Action mailed Apr. 21, 2011, from U.S. Appl. No. 11/224,635. 10 Pages.
Non-Final Office Action mailed Aug. 25, 2009, from U.S. Appl. No. 11/227,045. 13 Pages.
Non-Final Office Action mailed Aug. 30, 2010, from U.S. Appl. No. 11/152,214. 13 Pages.
Non-Final Office Action mailed Aug. 5, 2010, from U.S. Appl. No. 10/988,907. 6 Pages.
Non-Final Office Action mailed Aug. 6, 2014, from U.S. Appl. No. 13/367,198. 14 Pages.
Non-Final Office Action mailed Dec. 12, 2011, from U.S. Appl. No. 10/988,907. 8 Pages.
Non-Final Office Action mailed Feb. 18, 2009, from U.S. Appl. No. 11/147,539. 16 Pages.
Non-Final Office Action mailed Feb. 2, 2007, from U.S. Appl. No. 11/034,377, 12 Pages.
Non-Final Office Action mailed Jul. 21, 2010, from U.S. Appl. No. 11/147,539. 24 Pages.
Non-Final Office Action mailed Jul. 30, 2009, from U.S. Appl. No. 11/152,214. 18 Pages.
Non-Final Office Action mailed Jun. 9, 2011, from U.S. Appl. No. 11/152,214. 21 Pages.
Non-Final Office Action mailed Mar. 17, 2011, from U.S. Appl. No. 11/022,493. 12 Pages.
Non-Final Office Action mailed Mar. 23, 2010, from U.S. Appl. No. 11/224,635. 4 Pages.
Non-Final Office Action mailed Mar. 4, 2010, from U.S. Appl. No. 10/988,907. 7 Pages.
Non-Final Office Action mailed May 12, 2010, from U.S. Appl. No. 11/006,837. 27 Pages.
Non-Final Office Action mailed May 27, 2009, from U.S. Appl. No. 11/022,493. 14 Pages.
Non-Final Office Action mailed May 5, 2009, from U.S. Appl. No. 11/224,635. 9 Pages.
Non-Final Office Action mailed Nov. 14, 2007, from U.S. Appl. No. 11/022,493. 9 Pages.
Non-Final Office Action mailed Oct. 3, 2012, from U.S. Appl. No. 11/227,045. 14 Pages.
Non-Final Office Action mailed Oct. 5, 2006, from U.S. Appl. No. 11/022,493. 12 Pages.
Non-Final Office Action mailed Sep. 1, 2011, from U.S. Appl. No. 11/147,539. 8 Pages.
Non-Final Rejection mailed Jul. 23, 2013, from U.S. Appl. No. 13/711,549. 7 Pages.
Notice of Acceptance mailed Jan. 25, 2010, from Australian Patent Application No. 2006220489, 2 Pages.
Notice of Acceptance mailed Oct. 14, 2010, from Australian Patent Application No. 2005222507, 3 Pages.
Notice of Allowance and allowed claims mailed Dec. 18, 2012, from Japanese Patent Application No. 5173436. 8 Pages.
Stallings, W., "Network and Internetwork Security Principles and Practice", 1995, Prentice-Hall, Inc., 3 pages.
Stefik, M., "Trusted Systems", Scientific American, www.sciam.com/0397/issue/0397stefik.html, Mar. 1997, retrieved on Sep. 9, 1998, 9 pages.
Stefik, M., "Shifting the Possible: How Trusted Systems and Digital Property Rights Challenge Us to Rethink Digital Publishing", Technical Perspective, pp. 137-159, 1997, 24 pages.
Steinebach, et al., "Digital Watermarking Basics—Applications—Limits", NFD Information—Wissenschaft und Praxis, Jul. 2002, vol. 53, pp. 261-268, 8 pages.
Stevens, M., "How Secure is your Computer System?", The Practical Accountant, vol. 31, No. 1, pp. 24-32, (Jan. 1998), 9 pages.
Tarter, J., "The Superdistribution Model", Soft Trends, 13(6), pp. 1-6, Nov. 15, 1996, 7 pages.
Thompson, et al., "Digital Licensing", IEEE Internet Computing, vol. 9, No. 4, (Jul./Aug. 2005), pp. 85-88, 4 pages.
Torrubia, et al., "Cryptography Regulations for E-Commerce and Digital Rights Management", Computers and Security, 2001, 20(8), pp. 724-738, 15 pages.
Valimaki, M. et al., "Digital Rights Management on Open and Semi-Open Networks", WIAPP, 2001, pp. 154-155, 3 pages.
Weber, R., "Digital Rights Management Technologies", IFRRO, Oct. 1995, 60 pages.
White, S.R., et al., "ABYSS: A Trusted Architecture for Software Protection", IEEE Symposium on Security and Privacy, pp. 38-51, Apr. 27-29, 1987, 16 pages.
White, S.R., et al., "ABYSS: An Architecture for Software Protection", IEEE Trans. On Software Engineering, 16(6), pp. 619-629, Jun. 1990, 12 pages.
Yu, H., "Digital Multimedia at Home and Content Rights Management", IEEE Proceedings 2002 IEEE 4th International Workshop on Networked Appliances, 2002, pp. 49-56, 10 pages.
Zhang, et al., "Reconfigurable Security Protection System Based on Net FPGA and Embedded Soft-Core Technology", 2010 International Conference on Computer Design and Applications, ICCDA 2010, vol. 5, pp. 540-544, 5 pages.
Zhao, et al., "A New Watermarking Scheme for CAD Engineering Drawings", 9th Intl. Conf. Computer-Aided Industrial Design and Conceptual Design, Nov. 22-25, 2008, pp. 518-522., 5 pages.
Zwollo, K., "Digital Document Delivery and Digital Rights Management", Information Services & Use, 2001, pp. 9-11, 3 pages.
"Aladdin Acquires the Assets of Micro Macro Technologies", from <<http://www.findarticles.com>>, Business Wire, (Mar. 3, 1999), 2 pages.
"Aladdin Knowledge Systems Partners with Rights Exchange, Inc. to Develop a Comprehensive Solution for Electronic Software Distribution", (Aug. 3, 1988), 6 pages.
"Bankard Set to Intro Virtual Shopping in Philippines", Dow Jones Factiva, Newsbytes News Network, (Apr. 16, 1997), 2 pages.

(56) References Cited

OTHER PUBLICATIONS

"Black Box Crypton Defies the Hackers", Electronics Weekly, n. 1257, p. 26, (Mar. 6, 1985), 2 pages.
"BreakerTech Joins Copyright Management Market", from <<http://www.findarticles.com>>, Computergram International, (Aug. 5, 1999), 2 pages.
"Content Protection System Architecture: A Comprehensive Framework for Content Protection", Intel Corporation, 4C Entity, LLC., (Feb. 17, 2000), 19 pages.
"CYLINK: Public-Key Security Technology Granted to the Public; Cylink Announces the Renowned Diffie-Hellman Public-Key Technology Has Entered the Public Domain", Business Wire, (Sep. 16, 1997), 4 pages.
"Finland—Data Fellows Secures ICSA Certification", Newsbytes, (Jan. 7, 1998), 1 page.
"Free On-Line Dictionary of Computing Concatenate", (Dec. 12, 1995), 1 page.
"How to Prevent Copying DB Application to Other Machines", Discussion From Microsoft.Public.Access.Security, (Dec. 22, 1998), 4 pages.
"IBM Spearheading Intellectual Property Protection Technology for Information on the Internet", (May 1, 1996), 2 pages.
"Internet Dynamics: Internet Dynamics First to Ship Integrated Security Solution for Enterprise Intranets and Extranets, Conclave Accelerates Enterprise Deployment of Secure, High-Value Intranets and Extranets", Business Wire, (Sep. 15, 1997), 4 pages.
"Licenslt: Kinder, Gentler Copyright?", Copyright Management System Links Content, Authorship Information, Seybold Report on Desktop Publishing, 10(11), (1996), 2 pages.
"Managing Digital Rights in Online Publishing", How Two Publishing Houses Maintain Control of Copyright, Information Management & Technology, 2001, 34(4), pp. 168-169, 2 pages.
"Optimising License Checkouts from a Floating License Server", Arm the Architecture for the Digital World, from <<http://www.arm.com/support/faqdev/1391.html>>, (Sep. 9, 2008), 2 pages.
"Overview of Security of Windows Media Rights Manager", Microsoft Corporation, <<http://msdn.microsoft.com/ja-jp/library/dd148624.aspx>>, (Dec. 3, 2001), 7 pages.
"Postal Service Announces Plan to Postmarks on Electronic Mail", San Jose Mercury News, (Apr. 9, 1995), 2 pages.
"Rights Management in the Digital Age: Tradings in Bits, Not Atoms", No. 4, (Spring 1997), 3 pages.
"Solution for Piracy", Which Computer?, p. 29, (Nov. 1983), 4 pages.
"Sony Develops Copyright Protection Solutions for Digital Music Content", PR Newswire (copied from <<http://www.findarticles.com>>)., (Feb. 25, 1999), 2 pages.
"Technological Solutions Rise to Complement Law's Small Stick Guarding Electronic Works", Information Law Alert, 3-4 and 7, (Jun. 16, 1995), 3 pages.
"The New Network: Planning and Protecting Intranet Electronic Commerce", Information Week, No. 608, (Dec. 2, 1996), 7 pages.
Ahuja, G., "The Key to Keys", Dataquest (India), (Aug. 31, 1997), pp. 140-143, 4 pages.
Amdur, D., "InterTrust Challenges IBM Digital Content Metering", Report On Electronic Commerce, 3(15), 1-2 and 16-18, (Jul. 23, 1996), 5 pages.
Amdur, D., "Meeting Online Copyright", (Jan. 16, 1996), 2 pages.
Arbaugh, "A Secure and Reliable Bootstrap Architecture", IEEE Symposium on Security and Privacy, May 1997, pp. 65-71, 6 pages.
Armati, D., "Tools and Standards for Protection, Control and Presentation of Data", (Apr. 3, 1996), 18 pages.
Backman, D., "Smartcards: The Intelligent Way to Security", Network Computing, vol. 9, No. 9, pp. 168-171, (May 15, 1998), 2 pages.
Bajikar, S., "Trusted Platform Module (TPM) based Security on Notebook PCs—White Paper", Mobile Platforms Group Intel Corporation; <<http://www.intel.com/design/mobile/platform/downloads/Trusted_Platform_Module_White_Paper.pdf>>, (Jun. 20, 2002). 20 pages.
Benjamin, R., et al., "Electronic Markets and Virtual Value Chains on the Information Superhighway", Sloan Management Rev., 62-72, (Winter 1995), 12 pages.
Response, Amendment, Summarized Translation, Claims as filed Aug. 17, 2012, from Korean Patent Application No. 10-2007-7013731. 22 Pages.
Response, Amendment, Summarized Translation, Claims as filed Sep. 3, 2012, from Korean Patent Application No. 10-1213807. 18 Pages.
Restriction Requirement mailed Mar. 24, 2009, from U.S. Appl. No. 11/224,635. 6 Pages.
Restriction Requirement mailed Nov. 12, 2008, from U.S. Appl. No. 10/988,907. 6 Pages.
Restriction Requirement mailed Jan. 22, 2009, from U.S. Appl. No. 11/022,493. 7 Pages.
Result of Consultation mailed Jan. 10, 2008, from European Patent Application No. 05110697.9. 6 Pages.
Rule 70(2) mailed Jan. 25, 2011, from European Patent Application No. 5821183. 1 Page.
Search Report mailed Aug. 13, 2010, from European Patent Application No. 5823253.9. 7 Pages.
Search Report mailed Nov. 17, 2008, from European Patent Application No. 05824535.8. 5 Pages.
Second Office Action mailed Apr. 13, 2011, from Chinese Patent Application No. 200810189718.4. 6 Pages.
Second Office Action mailed Apr. 2, 2011, from Chinese Patent Application No. 200810189719.9. 6 Pages.
Second Office Action mailed Jul. 3, 2009, from Chinese Patent Application No. 2005-10113398.0. 7 Pages.
Second Office Action mailed Jun. 7, 2010, from Chinese Patent Application No. 200680030846.3. 6 Pages.
Second Office Action mailed Mar. 4, 2013, from Chinese Patent Application No. 200580044294.7. 7 Pages.
Substantiation of the Appeal filed Jun. 25, 2008, from European Patent Application No. 05110697.9. 38 Pages.
Summons to Attend Oral Hearing mailed Sep. 27, 2007, from European Patent Application No. 05110697.9. 33 Pages.
Supplemental Amendment filed Apr. 22, 2015, from U.S. Appl. No. 13/711,549. 8 Pages.
Supplementary European Search Report mailed Sep. 19, 2011, from European Patent Application No. 05855148.2. 1 Page.
Third Office Action mailed Aug. 30, 2013, from Chinese Patent Application No. 200580044294.7. 9 Pages.
Voluntary Amendment and English Translation of the Claims filed Feb. 23, 2011, from Korean Patent Application No. 10-1213882. 7 Pages.
Voluntary Amendment, Amended Claims and English translation of Amended Claims as filed Sep. 17, 2009, from Chinese Patent Application No. 200580044294.7. 11 Pages.
Written Appeal and Amendment filed May 16, 2012, from Japanese Patent Application No. 5173436. 6 Pages.
Written Opinion mailed Dec. 26, 2008, from PCT Patent Application No. PCT/US2008/067466. 4 Pages.
Written Opinion mailed Sep. 18, 2007, from PCT Patent Application No. PCT/US05/30490. 7 Pages.
U.S. Appl. No. 11/210,611, filed Aug. 24, 2005. 32 Pages.
U.S. Appl. No. 11/224,635, filed Sep. 12, 2005. 138 Pages.
U.S. Appl. No. 11/202,838, filed Aug. 12, 2005. 109 Pages.
U.S. Appl. No. 11/321,668, filed Dec. 29, 2005. 22 Pages.
U.S. Appl. No. 11/612,436, filed Dec. 18, 2006. 26 Pages.
U.S. Appl. No. 90/011,186, filed Aug. 25, 2010. 64 Pages.
Provision of the Minutes mailed Feb. 15, 2008, from European Patent Application No. 05110697.9. 35 Pages.
Request for Examination and Voluntary Amendment filed Mar. 8, 2011, from Canadian Patent Application No. 2597231. 15 Pages.
Request for Reexamination, Amended Claims and Translation of Amended Claims filed Apr. 3, 2014, from Chinese Patent Application No. 200580044294.7. 14 Pages.
Response filed Apr. 15, 2009, from Chinese Patent Application No. ZL200680006199.2. 9 Pages.
Response filed Apr. 4, 2013, from Canadian Patent Application No. 2597231. 6 Pages.

(56) References Cited

OTHER PUBLICATIONS

Amendment/Response filed Aug. 2, 2010, to Final Office Action dated May 11, 2010, from U.S. Appl. No. 11/152,214. 6 Pages.
Amendment/Response filed Aug. 25, 2008, to Final Office Action dated Jun. 11, 2008, from U.S. Appl. No. 11/022,493. 16 Pages.
Amendment/Response filed Aug. 30, 2007, to Final Office Action dated Mar. 30, 2007, from U.S. Appl. No. 11/022,493. 5 Pages.
Response filed Aug. 30, 2010, from Chinese Patent Application No. ZL200680006199.2. 8 Pages.
Response filed Aug. 5, 2009, to Non-Final Office Action dated May 5, 2009, from U.S. Appl. No. 11/224,635. 8 Pages.
Amendment in Response filed Aug. 7, 2008, to Non-Final Office Action dated Apr. 15, 2008, from U.S. Appl. No. 11/152,214. 11 Pages.
Amendment/Response filed Dec. 1, 2010 to Office Action dated Aug. 30, 2010, from U.S. Appl. No. 11/152,214. 5 Pages.
Response filed Dec. 17, 2007, from European Patent Application No. 05110697.9. 29 Pages.
Response filed Dec. 17, 2009, to Non-Final Office Action dated Aug. 25, 2009, from U.S. Appl. No. 11/227,045. 10 Pages.
Response filed Dec. 17, 2010, to Final Office Action dated Jun. 18, 2010, from U.S. Appl. No. 11/022,493. 5 Pages.
Response filed Dec. 18, 2008, from Japanese Patent Application No. 2007-548385. 3 Pages.
Response filed Dec. 21, 2009, from Australian Patent Application No. 2006220489. 14 Pages.
Response filed Dec. 23, 2008, from Chinese Patent Application No. ZL200680006199.2. 8 Pages.
Response filed Dec. 23, 2011, from European Patent Application No. 05855148.2. 16 Pages.
Amendment in Response filed Dec. 28, 2009, to Final Office Action dated Sep. 29, 2009, from U.S. Appl. No. 11/224,635. 9 Pages.
Response filed Dec. 5, 2008, to Office Action dated May 26, 2008, from European Patent Application No. 05109616.2. 25 Pages.
Response filed Dec. 9, 2008, to Restriction Requirement dated Nov. 12, 2008, from U.S. Appl. No. 10/988,907. 1 Page.
Response filed Dec. 9, 2011, from Japanese Patent Application No. 2007-548385. 8 Pages.
Response filed Feb. 1, 2010, to Non-Final Office Action dated Jul. 30, 2009, from U.S. Appl. No. 11/152,214. 9 Pages.
Decision on Reexamination mailed Jul. 30, 2015 from Chinese Patent Application No. 200580044294.7, 10 pages.
Notice of Allowance mailed Sep. 17, 2014, from U.S. Appl. No. 13/711,549. 8 Pages.
Notice of Divisional mailed Aug. 8, 2008, from Chinese Patent Application No. 2005-10113398.0. 24 Pages.
Notice of Fifth Office Action mailed Jul. 14, 2010, from Chinese Patent Application No. ZL200680006199.2. 6 Pages.
Notice of First Office Action mailed Aug. 22, 2008, from Chinese Patent Application No. ZL200680006199.2. 23 Pages.
Notice of Fourth Office Action mailed Jan. 8, 2010, from Chinese Patent Application No. ZL200680006199.2. 10 Pages.
Notice of Preliminary Examination mailed Aug. 22, 2008, from Chinese Patent Application No. 200580038773.8. 2 Pages.
Notice of Preliminary Rejection and Translation mailed Dec. 21, 2012, from Korean Patent Application No. 10-2007-7013731. 4 Pages.
Notice of Preliminary Rejection and Translation mailed Jun. 27, 2012, from Korean Patent Application No. 10-2007-7013731. 4 Pages.
Notice of Preliminary Rejection and Translation mailed May 31, 2012, from Korean Patent Application No. 10-2007-7011069. 4 Pages.
Notice of Rejection mailed Feb. 10, 2012, from Japanese Patent Application No. 2005-330496. 5 Pages.
Notice of Rejection and Translation mailed Jul. 8, 2011 from Japanese Patent Application No. 2007-41363. 10 Pages.
Notice of Rejection mailed Jun. 21, 2011, from Japanese Patent Application No. 2005-330496. 6 Pages.
Notice of Rejection mailed Nov. 11, 2011, from Japanese Patent Application No. 2005-301957. 21 Pages.
Notice of Rejection mailed Oct. 28, 2011, from Japanese Patent Application No. 2008-531182. 13 Pages.
Notice of Rejection and Translation mailed Sep. 9, 2011, from Japanese Patent Application No. 2007-548385. 9 Pages.
Notice of Second Office Action mailed Feb. 20, 2009, from Chinese Patent Application No. ZL200680006199.2. 9 Pages.
Notice of Third Office Action mailed Jun. 5, 2009, from Chinese Patent Application No. ZL200680006199.2. 7 Pages.
Notice on Grant of Patent mailed Oct. 20, 2010, from Chinese Patent Application No. ZL200680006199.2. 4 Pages.
Notice re Non-Compliant Amendment & Advisory Action mailed Sep. 10, 2008, from U.S. Appl. No. 11/022,493. 5 Pages.
Notice re Non-Compliant Amendment mailed Jan. 27, 2010, from U.S. Appl. No. 11/022,493. 3 Pages.
Office Action mailed Dec. 3, 2010, from Mexican Patent Application No. MX/a/2007/005655. 7 Pages.
Office Action mailed Feb. 9, 2010, from Mexican Patent Application No. MX/a/2007/005655. 8 Pages.
Office Action mailed Jun. 30, 2010, from Japanese Patent Application No. 2000-608242. 7 Pages.
Office Action mailed Mar. 19, 2010, from European Patent Application No. 05819896.1. 1 Page.
Office Action mailed Mar. 27, 2009, from U.S. Appl. No. 11/150,001. 11 Pages.
Office Action mailed Mar. 8, 2012, from European Patent Application No. 05109616.2. 6 Pages.
Office Action mailed May 21, 2013, from European Patent Application No. 05855148.2. 9 Pages.
Office Action mailed May 26, 2008, from European Patent Application No. 05109616.2. 5 Pages.
Office Action mailed Nov. 19, 2007, from European Patent Application No. 05102765.4. 7 Pages.
Examination Report mailed Oct. 30, 2015 from India Patent Application No. 02124/DELNP/2008, 2 pages.
Response filed Dec. 22, 2015 to Examination Report mailed Oct. 30, 2015 from India Patent Application No. 32124/DELNP/2008, 20 pages.
Response filed Dec. 14, 2015 from European Patent Application No. 05855148.2, 20 pages.
Response filed Jan. 28, 2016 from India Patent Application No. 2739/DEL/2005, 44 pages.
Notice on the Fourth Office Action mailed Jan. 28, 2016 from China Patent Application No. 200580044294.7, 15 pages.

\* cited by examiner

```xml
<DEVCERT version="1.0">
  <CERTIFICATE type="DEVICE">
    <DATA>
      <UNIQUEID private="1" />
      <PUBLICKEY private="1" />
      <KEYDATA />
    </DATA>
    <MSDRM_SIGNATURE_VALUE />
    <SYMSIGNATURE />
  </CERTIFICATE>
  <FALLBACK>
    <SECURITYVERSION>2.3.0.2</SECURITYVERSION>
    <CERTIFICATE private="1" />
  </FALLBACK>
  <CERTIFICATE type="GROUP">
    <DATA>
      <NAME>CoolNewDevice</NAME>
      <MANUFACTURER>FooInc.</MANUFACTURER>
      <MAKE>UnknownMake</MAKE>
      <DISTRIBUTOR>BarRetailersInc.</DISTRIBUTOR>
      <MODEL>XR-700</MODEL>
      <SECURITYLEVEL>1000</SECURITYLEVEL>
      <HARDWARE_VER_MAJOR>2</HARDWARE_VER_MAJOR>
      <HARDWARE_VER_MINOR>1</HARDWARE_VER_MINOR>
      <FIRMWARE_VER_MAJOR>1</FIRMWARE_VER_MAJOR>
      <FIRMWARE_VER_MINOR>3</FIRMWARE_VER_MINOR>
      <FEATURES>
        <TEMPLATE>0</TEMPLATE>
        <CLOCK>2</CLOCK>
        <SECURECLOCK>
          <URL>http://go.microsoft.com/fwlink/?LinkId=25817</URL>
          <PUBLICKEY>!CNhvvz1WaNV1AFUmetxkvm9iD4UrE9cnGUi!qcqdxMiXmD1*ikYGA==</PUBLICKEY>
        </SECURECLOCK>
        <METERING>1</METERING>
        <LICENSE_ACQ>1</LICENSE_ACQ>
        <LICENSE_SYNC>1</LICENSE_SYNC>
        <ENCRYPTION>1</ENCRYPTION>
      </FEATURES>
      <LIMITS>
        <MAXCHAINDEPTH>2</MAXCHAINDEPTH>
        <MAXLICENSESIZE>10240</MAXLICENSESIZE>
        <MAXHEADERSIZE>5120</MAXHEADERSIZE>
      </LIMITS>
      <PUBLICKEY>JCOnd9zBbmuXUGLRejnachQZ1mvnWkcyuqzCMFXK19cE1K9WaqIKiQ==</PUBLICKEY>
    </DATA>
    <MSDRM_SIGNATURE_VALUE>Wur1VKP!TZlc5NJ0jqCMcxTZ2xC!BgcGPULAwlp4*jREYp04iPu2ZQ==</MSDRM_SIGNATURE_VALUE>
  </CERTIFICATE>
  <CERTIFICATE type="AUTHORIZATION">
    <DATA>
      <SECURITYLEVEL>1000</SECURITYLEVEL>
      <AUTH_ID>42</AUTH_ID>
      <PUBLICKEY>qR!YzDsKeOmtMbmZMoBKLtd34CG1foosdNebvjCu6!6SX3bGbZ2pVw==</PUBLICKEY>
    </DATA>
    <MSDRM_SIGNATURE_VALUE>CLKXqfYPZA5OJnVUR32*3CznkiRSILz5CX6Z5LQLHQDAFaqZ9j2HbQ==</MSDRM_SIGNATURE_VALUE>
  </CERTIFICATE>
  <CERTIFICATE type="AUTHORIZATION_ROOT">
    <DATA>
      <AUTH_ID>1</AUTH_ID>
      <PUBLICKEY>a1t3hxrg!qbOgktnbYaEEi4teCse!gz6RvTPuC!zizKJlpU7xoduSw==</PUBLICKEY>
    </DATA>
    <MSDRM_SIGNATURE_VALUE>yI5BF4OIIZO!XeNtJdWql0ClJEH6iNPNS*qyjB1rJgTT!!d!Xq2UEg==</MSDRM_SIGNATURE_VALUE>
  </CERTIFICATE>
</DEVCERT>
```

FIG. 6

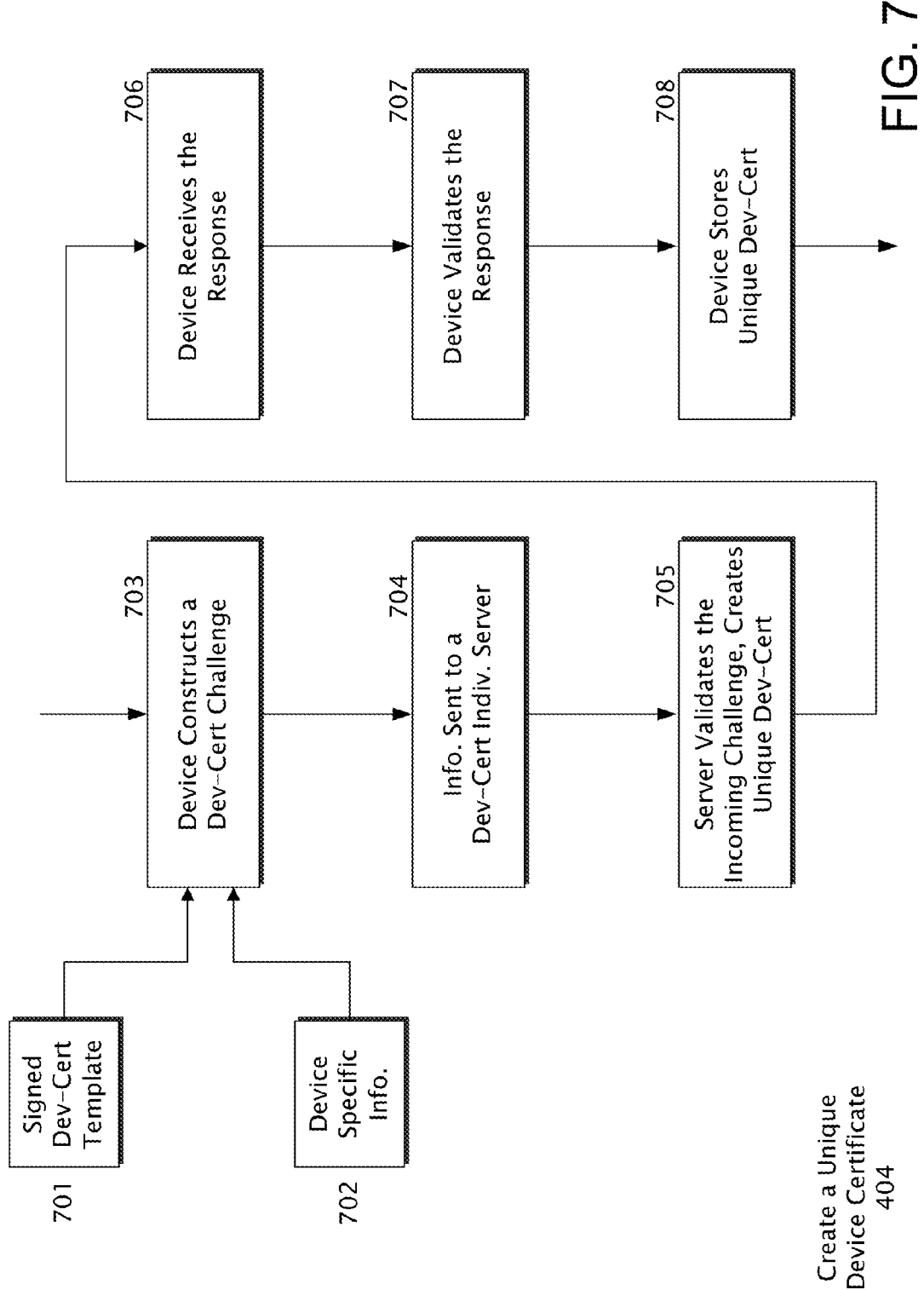

```
901  <DEVCERT type ="challenge">
       <DATA>
         <URL>www.myurl.com/indiv</URL>                     904
         <DEVCERT_TEMPLATE>
           Devcert template here.
         </DEVCERT_TEMPLATE>
     903 <BOOTSTRAPID>1</BOOTSTRAPID>
         <DEVINFO>
     905   <DEVICE_UNIQUEID>tAjF9OZ7DYnhlQrloN7XhE4gPGU=</UNIQUEID >
           <DEVICE_PUBKEY>
             RSveBuQ3vRe7AuCuVNqo22tvZHFUmUjSxIPAKAzPnzsW!YVm0j2iBg==
           </DEVICE_PUB_KEY >
           <DEVICE_PRIVKEY>
             RSveBuQ3vRe7AuCuVNqo22tvZHFUmUjSxIPAKAzPnzsW!YVm0j2iBg==
           </DEVICE_PRIVKEY>
           <DEVCERT_OLD >
     906     Old Devcert here.
           </DEVCERT_OLD >
         </DEVINFO>
     902 </DATA>
         <SIGNATURE>
           <HASHALGORITHM type="SHA"/>
           <SIGNALGORITHM type="MSDRM"/>
           <VALUE private="1">PSeo8mPIMEt0OieNF5xpiggrAGNx0vuSL2To9ZQYTmKt3KJrw."!eZw=</VALUE>
         </SIGNATURE>
     907 </DEVCERT >
```

Device Certificate Challenge Constructed at Block 703

FIG. 9

```
<DEVCERT type ="response">
    <ERROR>
        errorcode
    </ERROR>
    <DEVCERT_NEW>
        DevCert will be inserted here.
    </NEW_DEVCERT>
</DEVCERT>
```

1001 — `<DEVCERT type ="response">` ... `</ERROR>`
1002 — `<DEVCERT_NEW>` ... `</DEVCERT>`

Device Certificate Response received at block 706

FIG. 10

DEVICE CERTIFICATE INDIVIDUALIZATION

CROSS-REFERENCE TO RELATED APPLICATIONS

This patent application is a continuation of, and claims priority to, U.S. patent application Ser. No. 11/018,095 filed on Dec. 20, 2004, now U.S. Pat. No. 8,347,078which is a continuation-in-part of U.S. patent application Ser. No. 10/968,462 filed Oct. 18, 2004, now U.S. Pat. No. 7,441,121. U.S. patent application Ser. No. 11/018,095 and U.S. patent application Ser. No. 10/968,462 are both incorporated herein by reference in their entirety.

BACKGROUND

This application relates generally to the use of consumer electronic devices and more specifically to the creation of device certificates for verifying access rights.

Electronics may be designed to play or process content that is regulated. Such content may be controlled or owned by a third party that allows access to the content on a limited basis. Examples are allowing information to be accessed a predetermined number of times, or for a given time period. A common way of controlling access to content is through controlling access to a content key, and hence the content. Usage of the content must be consistent with a policy specified in the license in order for the DRM to access the license's key and enable access to the content. Control of access is typically provided at manufacture by security features that can prevent unauthorized access to the information at a later time.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present invention provides a method of creating a device certificate through an individualization process. The device certificate may be used for verifying access rights to consumer electronic devices through the use of device certificates. By building a consumer electronics devices with a template a unique device certificate can be generated at a later time and used to verify access rights. The device certificate is unique to the consumer electronics device and typically allows a person using the consumer electronics device to access protected content desired to be played on the device.

Security or encryption systems to protect against the unauthorized play of content or media files typically utilize a plurality of identifications, verifications, keys and the like to allow access to the content. Such security systems typically utilize a device certificate that contains a plurality of verifiers and the like, and is unique to the device seeking to play the content. By making it possible to delay the generation of a device certificate the manufacturing process tends so be simplified. The template contains information that tends to be common to all devices in a manufacturer's product line, and allows the device to self-generate a device certificate, utilizing a self individualization process, after the manufacturing process has been completed.

Many of the attendant features of this invention will be more readily appreciated as the same becomes better understood by reference to the following detailed description considered in connection with the accompanying drawings.

DESCRIPTION OF THE DRAWINGS

These and other features and advantages of the present invention will be better understood from the following detailed description read in light of the accompanying drawings, wherein:

FIG. 6 is an exemplary XML device certificate template.

FIG. 7 is a block diagram showing the process of device certificate individualization to create an exemplary device certificate.

FIG. 9 is an exemplary XML device certificate challenge.

FIG. 10 is an exemplary XML device certificate response.

Like reference numerals are used to designate like parts in the accompanying drawings.

DETAILED DESCRIPTION

Figure 1:
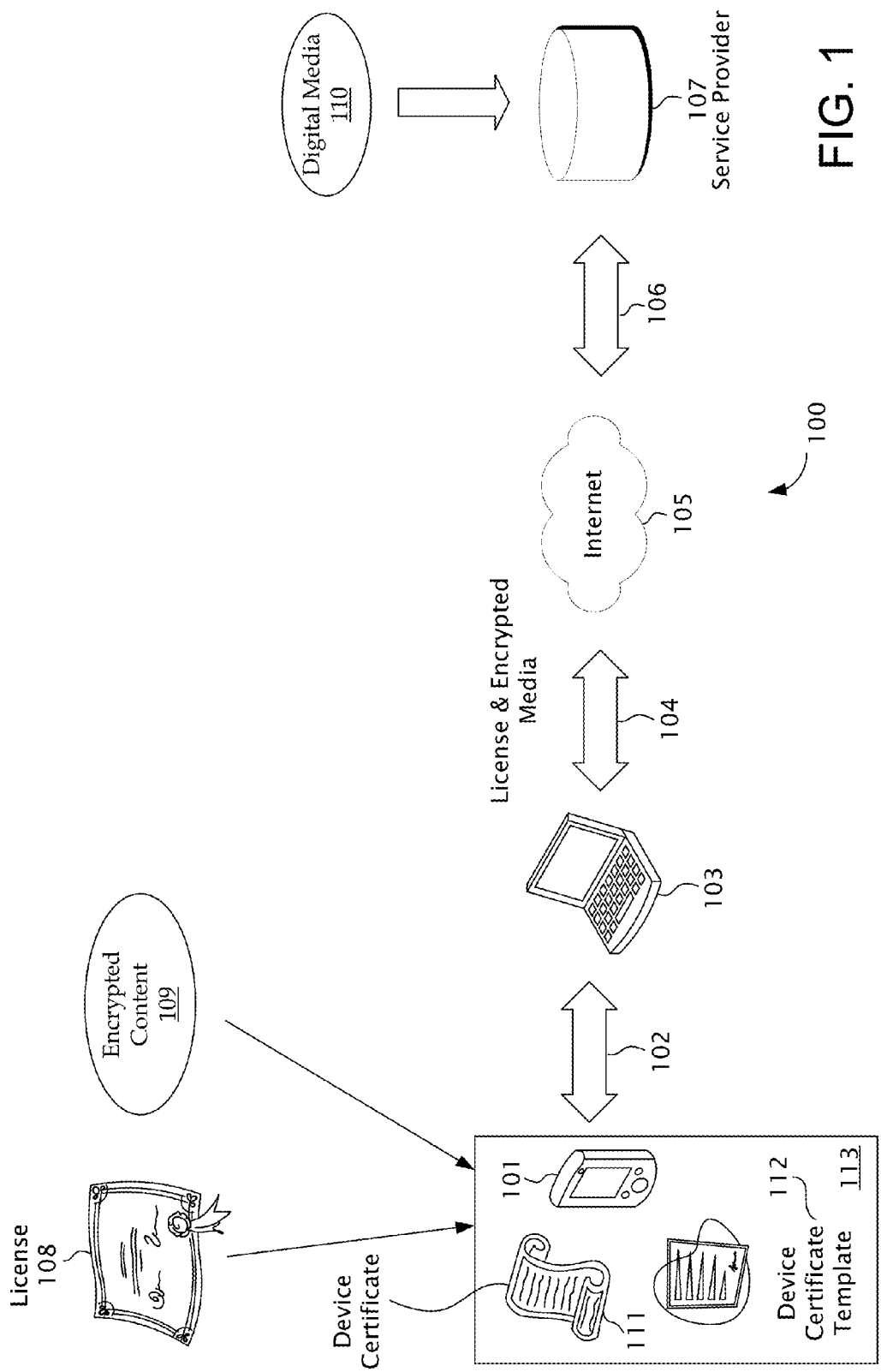
FIG. 1 is a diagram of a digital rights management system.

The detailed description provided below in connection with the appended drawings is intended as a description of the present examples of the invention and is not intended to represent the only forms in which the present invention may be constructed or utilized. The description sets forth the functions of the invention and the sequence of steps for constructing and operating the invention in connection with the examples illustrated. However, the same or equivalent functions and sequences may be accomplished by different examples of the invention.

Although the present invention is described and illustrated herein as being implemented in a consumer electronics ("CE") system, the system described is provided as an example and not a limitation. CE devices may include pocket PCs, set top boxes, portable media centers, cell phones, music players, PCs, software constructed media players, and the like. As those skilled in the art will appreciate, the present invention is suitable for application in a variety of different types of systems that utilize licenses to regulate the playback of content. A typical system is a digital rights management ("DRM") system. The use of a device certificate template may be useful in the individualization process typically used in these types of systems.

Most current DRM solutions rely on unique identification of user devices. Each license is typically bound to a unique playback device (or consumer electronics device), so the license stored in one device cannot be transferred or used by another device. To illustrate how this works, we use the example of a typical individualization process.

An individualized media player is one whose DRM component has been individualized, which is like receiving a security upgrade. Content providers may require their digital content to be played only on the player that has been individualized. During individualization process, the certificate authority's individualization service generates a unique dynamic link library ("DLL") that is bound to the client computer using its hardware ID. Once the player has been individualized, a public/private key pair is generated. The private key is stored in the DLL file that is generated in the individualization process. The corresponding public key is used as the player's identifier when requesting a license and a clearinghouse will encrypt the license using this key. If the player is moved to another host, it may require another individualization, because there is no corresponding DLL file binding to the new host. The license granted by the clearinghouse is not transferable or usable on another computer.

In the context of DRM, individualization can reduce the damage caused by system cracking, because if the DRM module on a user's computer is compromised, only that terminal is affected. However, it introduces another problem concerning the portability of rights: When the user wants to watch the movie at his friend's place or listen to the music on his portable devices (PDAs, mobile phones, portable players, etc.), he has to acquire new licenses for every device to enable content consumption. To reduce the impact of digital licensing process on the user experience, some DRM solutions allow users to back up their licenses and restore to another computer. To prevent abuse, users can typically only do this a fixed number of times.

FIG. 1 is a diagram of a digital rights management system 100. Digital rights management (DRM) provides a system for defining, incorporating, and enforcing rights to digital media 110. A DRM system 100 provides secure distribution of multimedia content 110 from a service provider 107 over insecure channels such as the Internet 105. The system 100 can enforce usage rules and protect the multimedia content 110 from being used illegally. Usage rules can include expiration dates, the number of times a user can play an audio or video file, and the number of times a user can copy an audio or video file and the like. An example of a Digital Rights Management system is provided in U.S. patent application Ser. No. 09/290,363, filed Apr. 12, 1999, U.S. patent application Ser. Nos. 10/185,527, 10/185,278, and 10/185,511, each filed on Jun. 28, 2002 which are hereby incorporated by reference in its entirety.

A personal computer 103 may be used to connect to the internet 105 and transfer content from the service provider 107 to a consumer electronics device 101. Protocols for transferring information to the PC 103, and to the CE device 101 over paths 102 and 104 may be achieved by conventional connections such as USB, infrared, Blue Tooth, MTP and the like. In alternative embodiments a consumer electronics device may be coupled to a service provider without using the personal computer 103. The personal computer and the CE devices may operate utilizing any number of suitable operating systems known to those skilled in the art. The instructions for implementing the functions described in this application may exist as software, hardware (for example instructions burned into an ASIC), or a combination of both.

In typical use, DRM 100 protects contents 110 by providing encrypted data files 109. Since files 109 are encrypted, the data itself is protected. Thus, the files 109 may be moved, archived, copied, or distributed without restriction. There is no need to hide files or make them inaccessible, or to put special protection in place when files are transmitted from system to system. However, copying a file and giving it to a friend will not enable that friend to use the file. In order to be able to use an encrypted file, users must obtain a license 108. This license 108 is a way of exercising control over the encrypted file 110. A license 108 is typically granted to a single machine 101, and even if copied, it will not tend to function on other machines.

Each license 108 contains rights and restrictions, defining how the data in a file may be used, and under what conditions. For example, a music file license may contain a "right to play" but not a "right to burn to CD", and it might enable these rights for the period between Oct. 1, 2005 and Nov. 1, 2005. It is also possible that there will be multiple licenses for a file. As long as one of those licenses grants the needed right, the user will be able to access and use their data. Access may refer to cryptographically decrypting a file, gaining access to a file by password, and the like so that the consumer electronics device can use, view, play and otherwise use the content of the file.

In the embodiments of the invention described the license 108 works in conjunction with a device certificate 111 that allows the encrypted content 109 to be played on a consumer electronics device 101. The file can also be viewed if the CE device provides video, or picture capabilities. Files for viewing or playback would typically include music files, picture files, video files, documents, and the like. In short anything that a service provider wishes to transmit securely over an unsecured channel. The system identifies itself through a device certificate. This exemplary XML structure, or its equivalent, describes the CE device, lists supported features, and also contains the system's public key. The device certificate 111 is unique to an individual consumer electronics device. In the embodiments the unique device certificate 111 is generated from a device certificate template 112 that is packaged 113 with the consumer electronics device 101. The device certificate template may be considered a special pattern, guide or the like that aids in the creation of the device certificate.

Consumer electronic devices 101 that regulate playback may be referred to as digital rights management ("DRM") devices. Such devices may be part of a DRM system 100 that controls the distribution of protected content 109 and access to that content 110. DRM-enabled devices 101 may contain an XML (or the equivalent of XML) object called a "Device Certificate" ("Dev Cert") 111 which is used to help ensure the security of DRM operations. Typically a device certificate can be provided in any format or data structure, besides XML. The device certificate 111 is unique to each CE device 101 and is typically harder for a manufacturer to provide in the CE device 101 than a simple serial number.

Device certificates 111 are security devices that may be used in consumer electronics devices 101 to provide security by authenticating that a device 101 is allowed to access protected content 109. Device certificates are the credentials that are trusted and relied upon by an outside entity that may cause the entity provide content to the CE device. Such automated device authentication may be used in systems 100 designed for secure playback or use of protected media content and where digitally signed certificates 111, or the like, are used as the way of providing authentication of rights to access media content. Protected media content 109 may include music, video, text, or any content that is subject to management by conventional license agreements or the like.

The exemplary device certificate 111 may be an XML object that gathers together device identification, device capabilities claims, vital info, public key info, and the like and present the information in a single digitally signed device certificate. A device certificate typically utilizes as a minimum the public key and a signature, other information included in the device certificate is optional The device certificate 111 may be signed by an OEM signing certificate (not shown), which may be a certification by the OEM that the device certificate 111 is an accurate reflection of the device 101 accompanying it, and by a third party content regulator certificate (not shown) which certifies that the OEM is authorized to create and certify DRM systems.

The embodiments of the invention tend to solve manufacturing problems associated with generating unique and verifiable device certificates 111 for each consumer electronics device 101 in an OEMs product line. The embodiments tend to allow the manufacturer to ship an entire product line using a device certificate template 112 which is typically identical for all devices in the product line. Using the template 112, a device 101 may automatically and securely self-individualize after manufacturing. In other words, the device creates a unique device certificate 111 based on the template 112 built into the device. The device 101 may then access the encrypted content 109, when the proper license 108 is present.

The device certificate template 112 may have the sections of a typical device certificate, but device specific sections are empty. The template 112 is signed by the OEM or manufacturer and includes the third party content provider's own device authorization certificate. To create the device certificate 111 from the device certificate template 112 a process of device certificate individualization is initiated. Once the device certificate has been created, protected content may be loaded onto the CE device.

Figure 2:
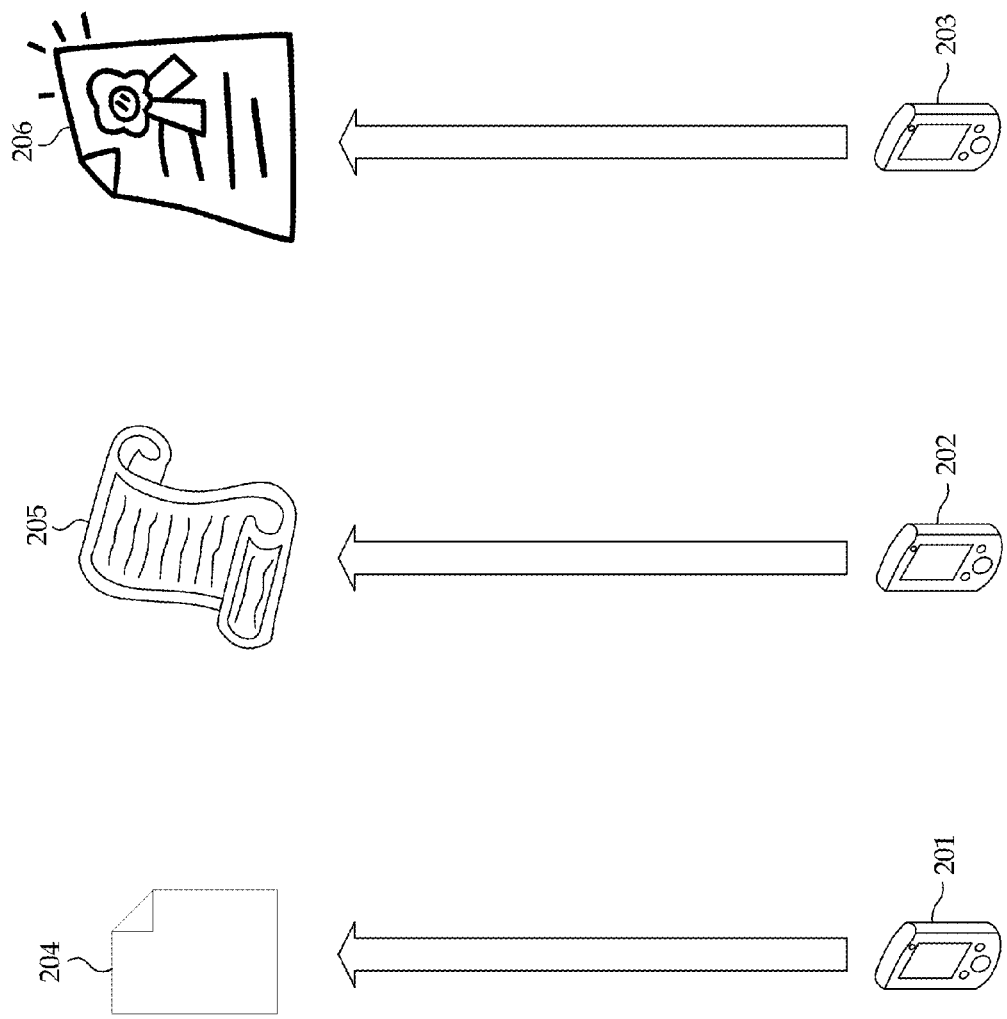
FIG. 2 illustrates the conventional method of manufacturing consumer electronics devices with complete device certificates.

FIG. 2 illustrates the conventional method of manufacturing consumer electronics devices 101, 102, 103 with complete device certificates 104, 105, 106. A manufacture will typically produce a product line of consumer electronic devices 201, 202, 203 shown. Each consumer electronics device 201, 202, 203 is built with a corresponding unique device certificate 204, 205, 206. Each device certificate is unique to the consumer electronics device that was shipped with it. Providing a device certificate is typically an additional step that is needed in the manufacture of consumer electronics devices that tends to increase the cost and complexity of consumer electronics devices.

Figure 3:
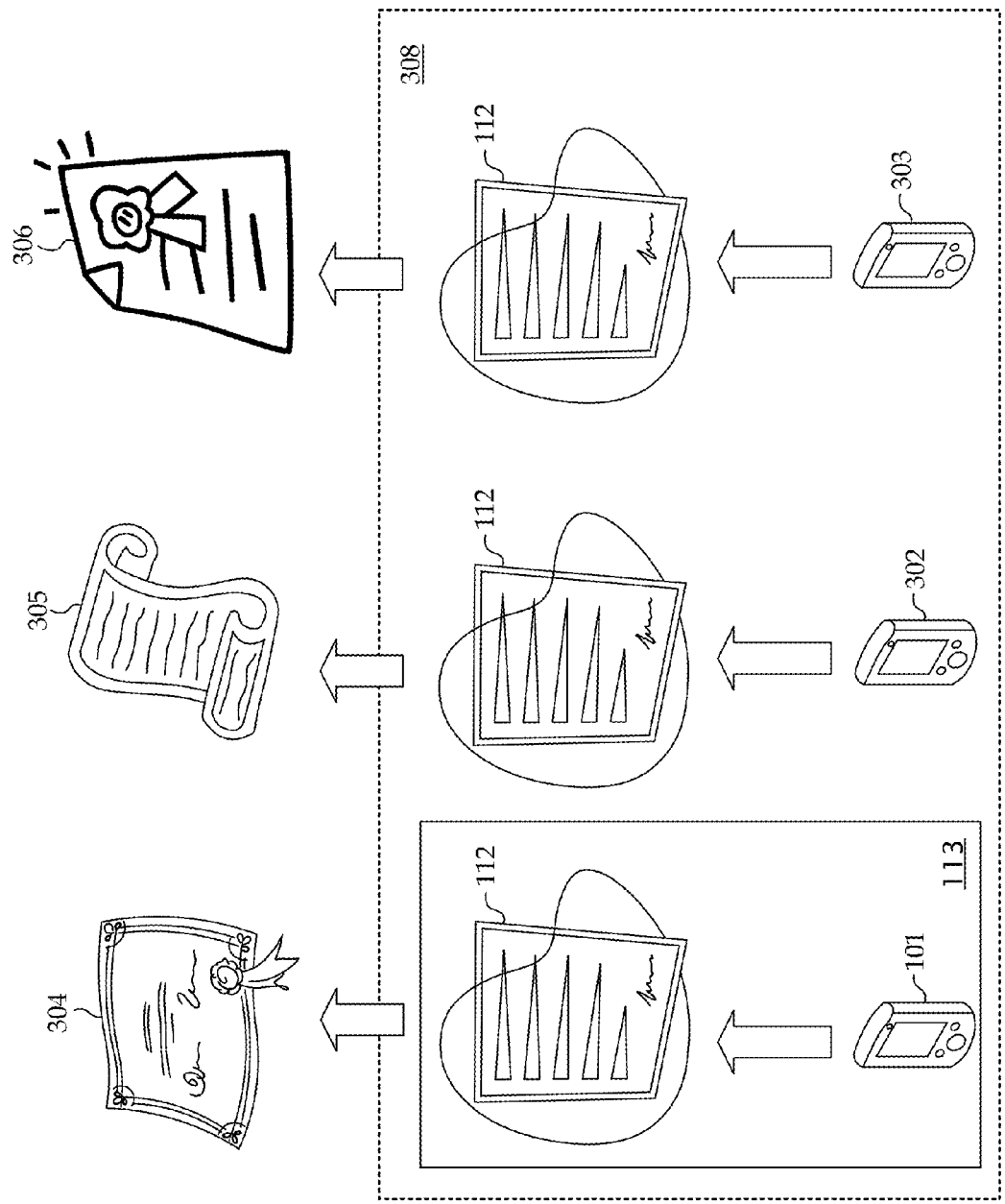
FIG. 3 illustrates a method of manufacturing consumer electronics devices with device templates that will enable the generation of complete device certificates at a later time.

FIG. 3 illustrates a method of manufacturing consumer electronics devices 101, 302, 303 with common device templates 112 that will enable the later generation of complete device certificates 304, 305, 306 at a later time. In the example shown any number of consumer electronics devices may be built in a production run or lot of devices produced, with typically the same device certificate template 112. Loading each device with the same template may aid the manufacturing process by allowing the device certificate to be created at a later time by filling in the template so that the device certificate is generated from the template. As an example an entire production run of devices having ROMs may be built using the same ROM, flash, hard drive or equivalent image on each device. There tends not to be individualized programming for each device built because of the use of a device certificate template.

Figure 4:
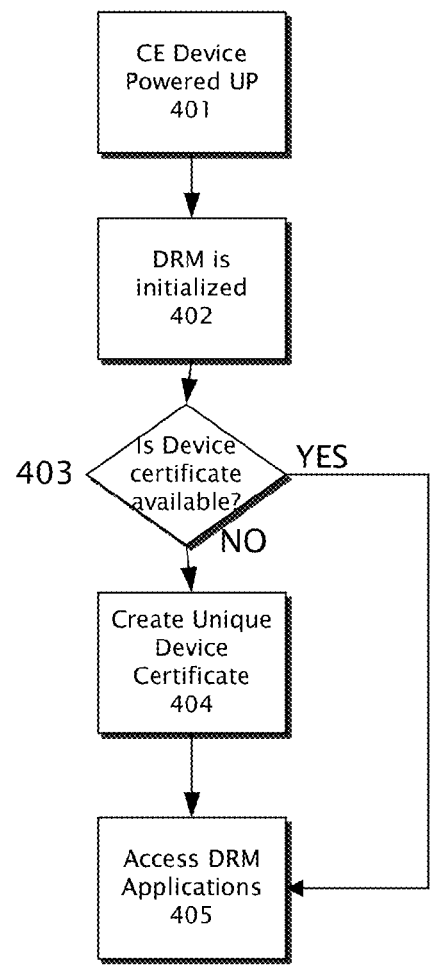
FIG. 4 is a block diagram of the device certificate individualization or initialization process that transforms the device certificate template into a unique device certificate prior to allowing access to DRM applications.

FIG. 4 is a block diagram of the device certificate individualization or initialization process that transforms the device certificate template into a unique device certificate. Device certificate individualization may occur after the CE device has been shipped, and typically creates the device certificate before DRM content is accessed. Non-DRM content typically will not initiate the self individualization process, since a device certificate is typically not needed to access non-DRM content. If the CE device is compromised, device certificate individualization may be repeated after wiping out old device certificate. However the device may also need to get an updated template from the manufacturer, because the device certificate is based on template. If the device certificate is revoked, a new device certificate from the old template will also be revoked.

At block 401 the CE device is powered up. Power up or in alternative embodiments an attempt to access DRM protected content may initiate the individualization process. At block 402 DRM is initialized. At block 403 if the device certificate is available the process skips to block 405. If the device certificate is not available at block 403 the process continues to block 404.

At block 404 a unique device certificate is created. And finally at block 405 the DRM content is accessed.

Figure 5:
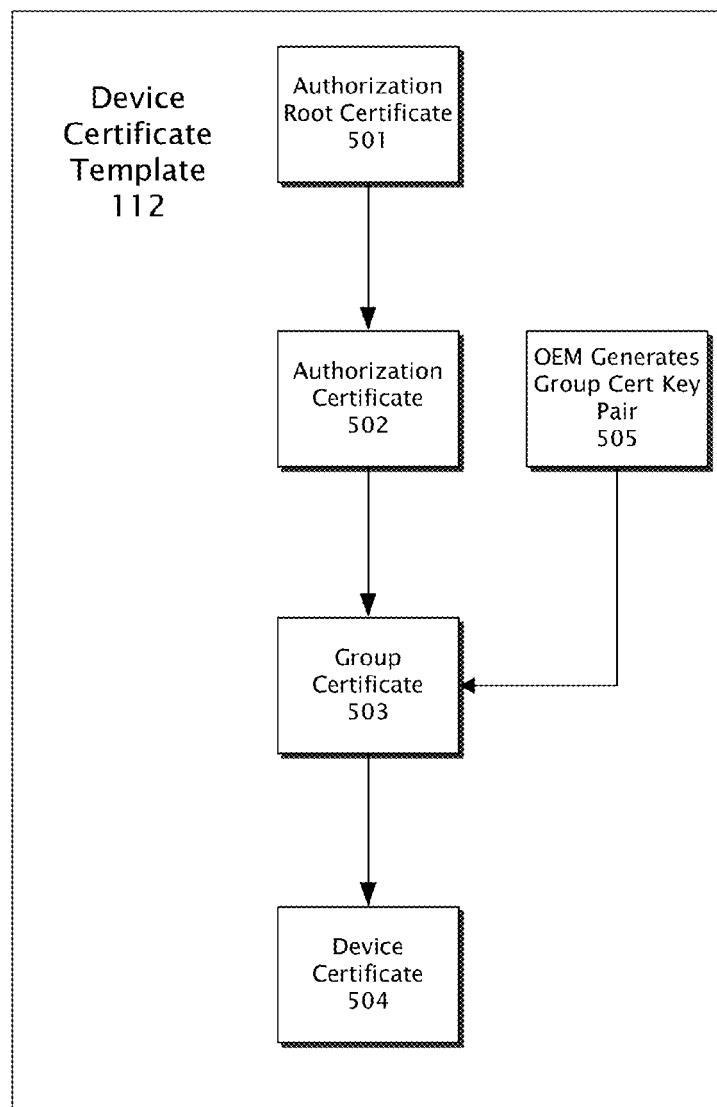
FIG. 5 illustrates the sections that make up a first exemplary device certificate template.

FIG. 5 illustrates the sections that make up the device certificate template 112. A template as described would typically be stored in a memory of the consumer electronic device. Equivalently the template may be stored on other types of memories such as flash RAM ASICS, one or more floppy disks, optical disks, hard disks and the like. The sections of the device certificate template work together to establish a route of trust so that the content provider has a reasonable expectation that the data being transmitted over the insecure channels will reach an authorized user. For backwards compatibility, or other purposes more than one route of trust may be provided in the device certificate template.

In establishing a route of trust, that is reflected in the device certificate template, an OEM typically generates a public and private key pair. This device authorization certificate ("DAC") generated by the OEM includes a private key that is stored in a secure location by the OEM. Also included is a public key that is typically sent to a certificate authority. The certificate authority verifies the OEM's DAC and returns the Authorization Root certificate and Authorization Certificate which are sent back to the OEM.

The OEM is equipped with a software tool from the certificate authority to generate a Group Certificate. The group certificate may include features of the device, limits, meta data (manufacturer name, model number and the like). The OEM then signs this Group Certificate with the DAC private key. Putting the AUTHORIZATION_ROOT Certificate 501, AUTHORIZATION Certificate 502 and the Group Certificate on the unsigned template allows the template to be generated and put onto the device plus the group certification private key. After manufacture, a trigger, such as powering the device up, or attempting to access a file, will cause the Device Certificate to be generated by filling out any needed information called for in the template and signing with the group certification private key. The trigger may be thought of as an initiating event, or a start command that starts the self individualization process or device certificate generation.

In establishing the route of trust each of the individual certificates in the device certificate establishes a route of trust that can be traced back to the OEM. If need be individual certificates can be revoked, breaking the chain.

The AUTHORIZATION_ROOT Certificate 501 is a section contained in the device certificate template. This section contains the certificate authority's root certificate information. The certificate authority's root certificate is typically the highest level of authorization, and is issued by the certificate authority. Other certificates that make up the chain of trust to allow content access may be based upon the authorization root certificate. In general, the root certificate contains an ID (Identifying whom are you certifying) and a public key which is being certified. This certificate is signed by certificate authority's private key. The private key is typically stored in a secure vault controlled by the certificate authority. A corresponding public key is hard coded in the security system's code of the CE device to verify the signature.

AUTHORIZATION Certificate: This section contains Authorization to an OEM by the certificate authority to produce Device certificates. The data section contains an Authorization ID of OEM, Max security level of the device, and a Public key to sign Group certificate. This data section is signed using the certificate authority's private key. The corresponding Public key is in the Authorization Root Certificate.

GROUP Certificate: This Data section contains device features which are identical for entire product line such as name of device, manufacturer etc. It contains a GROUP Certificate Public key which is in turn a basis of verifying the DEVICE certificate section. The corresponding private key is hidden on the device. The device certificate section is signed using this private key.

FIG. 6 is an exemplary XML device certificate template. The device certificate template may be written in XML or its equivalent. An example of XML code implementing the authorization root certificate 501 is as shown. The authorization root certificate includes calling the public key. Also included in the device certificate template is the XML code that makes up the authorization certificate 502. And above that, the XML code that makes up the group certificate 503 is shown. Lastly the section of the XML encoded template that will be filled in to create the device certificate 504 is shown at the top of the page. Provisions for backwards compatibility or legacy licensing 601 are included in the XML code.

The various sections that make up the device certificate template may appear in any order in the template, with the shown order being but one example. Also the device certificate template may be coded in a variety of languages such as html, binary format and the like. In alternative embodiments it is also possible to load the template from a server, rather than having the manufacturer preload the template on the CE device.

FIG. 7 is a block diagram showing the process of device certificate individualization to create an exemplary device certificate. The process utilizes a challenge and response exchange between the device and the service provider. During this exchange security tends to be maintained by providing an exchange of keys having an intermediate security level. The keys having the intermediate security level are used to initiate the process, and "bootstrap" the verification process up to a higher security level.

In order to provide the unique device certificate or "Unique Dev-cert", to each device, a device certificate individualization process is followed to create a unique device certificate 404 (of FIG. 4). At block 703 the device constructs a device certificate challenge to initiate the process by gathering device specific info at block 702 and a signed device certificate template at block 701. The device certificate template 112 provided to this block may be as previously described and include an authorization certificate from the service provider, device information (manufacturer, model, version and the like), template field confirming a template is provided, a URL to which the device certificate challenge should be sent, a public key used to encrypt device private data in the device certificate challenge, and a digital signature for the data portion of the template. The device specific information may in general include information that is unique to the device that is seeking to have its device certificate formed. Specifically device specific information includes an identification string based on device serial number.

At block 704 this unique information from the challenge is sent to a server (or "Dev-cert indiv server") that may be ran by the OEM of the device. The data sent to the server is typically private and protected. The server validates the incoming challenge and creates the unique device certificate "Unique Dev-cert" at block 705 based on the challenge. A response including the device certificate that has been created is returned to the device ("Dev-cert response") at block 706. At block 707 the device validates the received response. At block 708 the device stores the device certificate that has been created.

Figure 8:
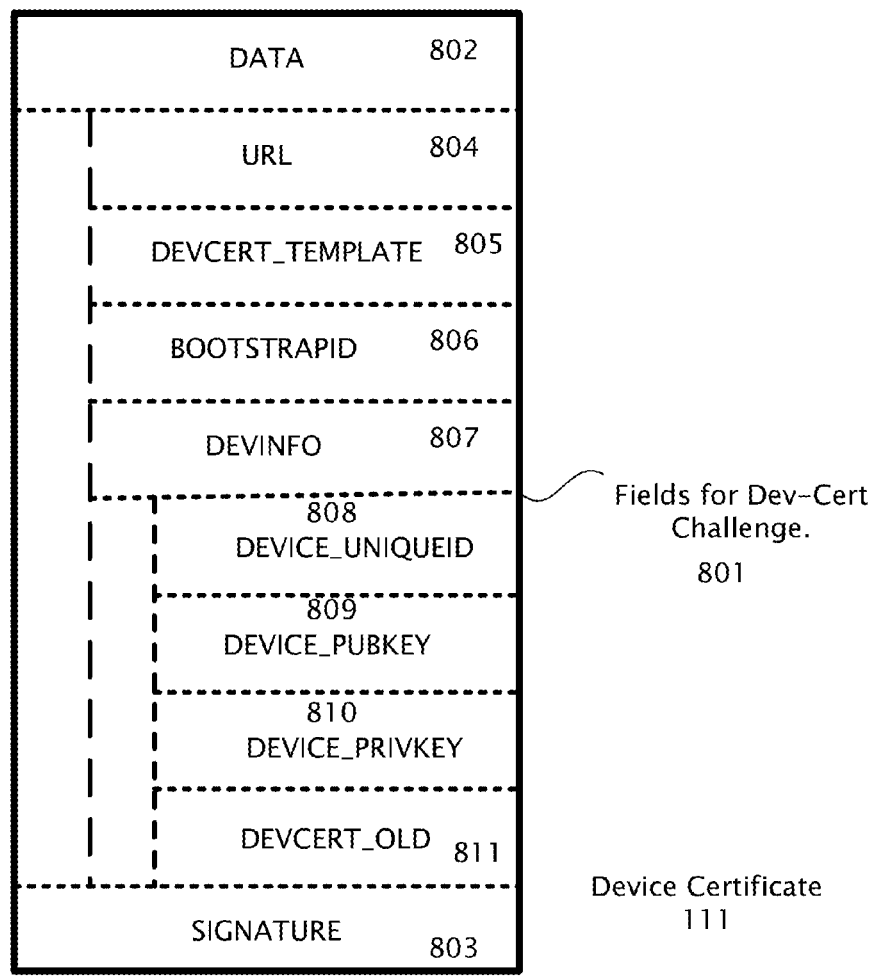
FIG. 8 illustrates the sections that make up an exemplary device certificate challenge used in the process of device certificate individualization.

FIG. 8 illustrates the sections that make up an exemplary device certificate challenge used in the process of device certificate individualization. The arrangement of sections in the device certificate may be varied, and the language or protocol used to encode the information in the various sections may vary as well. The Data section includes URL (804), DEVCERT_TEMPLATE (805), BOOTSTRAPID (806) and DEVINFO (807). The DEVINFO may contain DEVICE_UNIQUEID (808), DEVICE_PUBKEY (809), DEVICE_PRIVKEY (810) and DEVCERT_OLD (811).

The DATA section is shown at 802. This data section or tag contains the data presented by the device certificate challenge. This tag is typically mandatory. Typically this data may include URL (804), DEVCERT_TEMPLATE (805), BOOTSTRAPID (806) and DEVINFO (807). The DEVINFO may contain DEVICE_UNIQUEID (808), DEVICE_PUBKEY (809), DEVICE_PRIVKEY (810) and DEVCERT_OLD (811).

The SIGNATURE section is shown at 803. Typically the contents of the DATA section, including the strings <DATA> and </DATA> of dev-cert challenge are digitally signed by a BOOTSTRAP private key which is provided by OEM. This section also contains a digital signature that is typically mandatory.

The URL section is shown at 804. In this section the URL that the device certificate challenge is sent to is recorded. It is in clear (it is non encrypted). This URL may be taken from the device certificate template, so that the application does not need to separately parse the device certificate template to get the URL. This tag may be mandatory. In an alternative embodiment the URL may be parsed from the device certificate template.

The DEVCERT_TEMPLATE section of the device certificate challenge is shown at 805. A valid device certificate template provided in this section is typically signed by the OEM private key. This node may also be in clear. This tag is typically mandatory.

The BOOTSTRAPID section of the device certificate challenge is shown at 806. The Bootstrap ID is also provided by OEM. The bootstrap ID is typically provided to help the server to find the right key for verifying the dev-cert challenge signature. This node is in clear. This tag may be mandatory.

The DEVINFO section of the device certificate challenge is shown at 807. This section contains device specific private info which must be protected. The contents under this tag are encrypted using Indiv server public key which is present in dev-cert template. This information is then Base64 encoded. This tag is typically mandatory. This node may contain DEVICE_UNIQUEID (808), DEVICE_PUBKEY (809), DEVICE_PRIVKEY (810) and DEVCERT_OLD (811).

The DEVICE_UNIQUEID section of the device certificate challenge is shown at 808. This section contains the unique device id. This unique device id is typically inserted in actual device unique device certificate by the server. This tag is typically mandatory.

The DEVICE_PUBKEY section of the device certificate challenge is shown at 809. In the process of constructing the challenge, the device generates a public private key pair, and hides the private key in the device as previously described. This section typically contains a Base 64 encoded device public key. Those skilled in the art will realize that other equivalent encodings may be provided. The public key is inserted, by the server, into the actual device unique device certificate. This public key may also be used by the server to encrypt the response returned to the device. This tag is typically mandatory.

The DEVICE_PRIVKEY section of the device certificate challenge is shown at 810. This section may contain a base 64 encoded device private key. The device private key may be used by the server to encrypt an escrow key generated by the server. An escrow key typically encrypts any old keys present from the client. This tag is typically mandatory.

The DEVCERT_OLD section of the device certificate challenge is shown at 811. This section contains an old "device unique dev-cert". This section is typically an optional tag. It may be included in case of re-individualization of the device so that the server can extract the old key pairs from this device certificate and include them in a new device certificate.

FIG. 9 illustrates an exemplary XML device certificate challenge previously constructed at block 703 (of FIG. 7). In the example shown the device certificate shown in XML (or its equivalent) may be base 64 encoded. Alternatively other types of encoding may be performed to facilitate transmission of the device certificate challenge to the server. In further alternative embodiments encoding is not performed.

When server receives the challenge 901, the server, identified by the supplied URL 904, verifies the authenticity of the challenge by verifying the device challenge's digital signature 902. The BOOTSTRAP ID 903 allows the server to find the proper key for signature verification. The server also verifies the signature of the device certificate template 905 that is included in the challenge. The server then decodes and decrypts the DEVINFO section 906 to get the device specific information.

After gathering the information, the device certificate challenge creates the actual device unique device certificate and includes this device certificate in the response 907. To protect privacy, the device certificate response may be encrypted by the device public key. This encryption ensures that the response can only be decrypted by the device, from which device certificate challenge was received.

FIG. 10 is an exemplary XML device certificate response. The device response is shown in HTML format. However, any suitable format may be used for the device certificate response.

The device certificate response may include the following fields. The error field ("ERROR") 1001 may be an optional field. Presence of the error field indicates that the challenge sent to the server had some errors in it that have been indicated by an error code.

The field DEVCERT_NEW 1002 contains the actual device unique device certificate produced by the exchanges made between the device and the service coupled to the device. As previously described a PC may be present between the device and the service provider.

When a device receives the device certificate response, it decodes and decrypts it. If an error field 1001 is present, the device returns the error code to the application. If the error tag is not present, it extracts the device certificate, verifies its signature, service provider authorization certificate, device unique id, device public key and all other sections of the device certificate. Then the device certificate is stored in the device.

Figure 11:
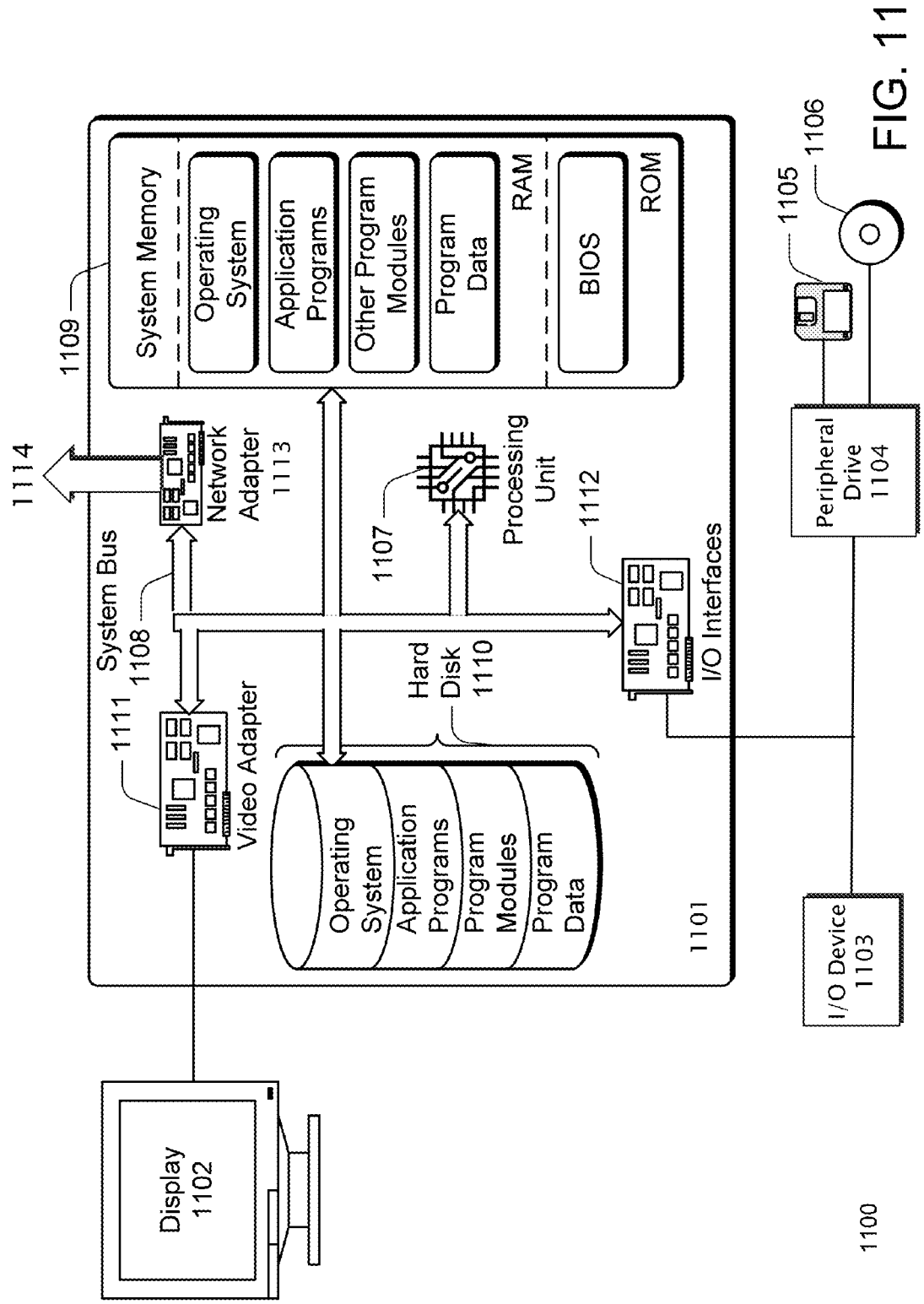
FIG. 11 illustrates an exemplary computing environment in which the systems and methods described in this application, may be implemented.

FIG. 11 illustrates an exemplary computing environment 1100 in which the systems and methods described in this application, may be implemented. Exemplary computing environment 1100 is only one example of a computing system and is not intended to limit the examples described in this application to this particular computing environment.

The computing environment 1100 can be implemented with numerous other general purpose or special purpose computing system configurations. Examples of well known computing systems, may include, but are not limited to, personal computers, hand-held or laptop devices, microprocessor-based systems, multiprocessor systems, set top boxes, programmable consumer electronics, gaming consoles, Consumer electronics, cellular telephones, PDAs, and the like.

The computer 1100 includes a general-purpose computing system in the form of a computing device 1101. The components of computing device 1101 can include one or more processors (including CPUs, GPUs, microprocessors and the like) 1107, a system memory 1109, and a system bus 1108 that couples the various system components. Processor 1107 processes various computer executable instructions to control the operation of computing device 1101 and to communicate with other electronic and computing devices (not shown). The system bus 1108 represents any number of several types of bus structures, including a memory bus or memory controller, a peripheral bus, an accelerated graphics port, and a processor or local bus using any of a variety of bus architectures.

The system memory 1109 includes computer-readable media in the form of volatile memory, such as random access memory (RAM), and/or non-volatile memory, such as read only memory (ROM). A basic input/output system (BIOS) is stored in ROM. RAM typically contains data and/or program modules that are immediately accessible to and/or presently operated on by one or more of the processors 1107.

Mass storage devices 1104 may be coupled to the computing device 1101 or incorporated into the computing device by coupling to the buss. Such mass storage devices 1104 may include a magnetic disk drive which reads from and writes to a removable, non volatile magnetic disk (e.g., a "floppy disk") 1105, or an optical disk drive that reads from and/or writes to a removable, non-volatile optical disk such as a CD ROM or the like 1106. Computer readable media 1105, 1106 typically embody computer readable instructions, data structures, program modules and the like supplied on floppy disks, CDs, portable memory sticks and the like.

Any number of program modules can be stored on the hard disk 1110, Mass storage device 1104, ROM and/or RAM 1109, including by way of example, an operating system, one or more application programs, other program modules, and program data. Each of such operating system, application programs, other program modules and program data (or some combination thereof) may include an embodiment of the systems and methods described herein.

A display device 1102 can be connected to the system bus 1108 via an interface, such as a video adapter 1111. A user can interface with computing device 702 via any number of different input devices 1103 such as a keyboard, pointing device, joystick, game pad, serial port, and/or the like. These and other input devices are connected to the processors 1107 via input/output interfaces 1112 that are coupled to the system bus 1108, but may be connected by other interface and bus structures, such as a parallel port, game port, and/or a universal serial bus (USB).

Computing device 1100 can operate in a networked environment using connections to one or more remote computers through one or more local area networks (LANs), wide area networks (WANs) and the like. The computing device 1101 is connected to a network 1114 via a network adapter 1113 or alternatively by a modem, DSL, ISDN interface or the like.

Those skilled in the art will realize that storage devices utilized to store program instructions can be distributed across a network. For example a remote computer may store a tool such as the adaptive instrumentation runtime monitoring and analysis software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Figure 12:
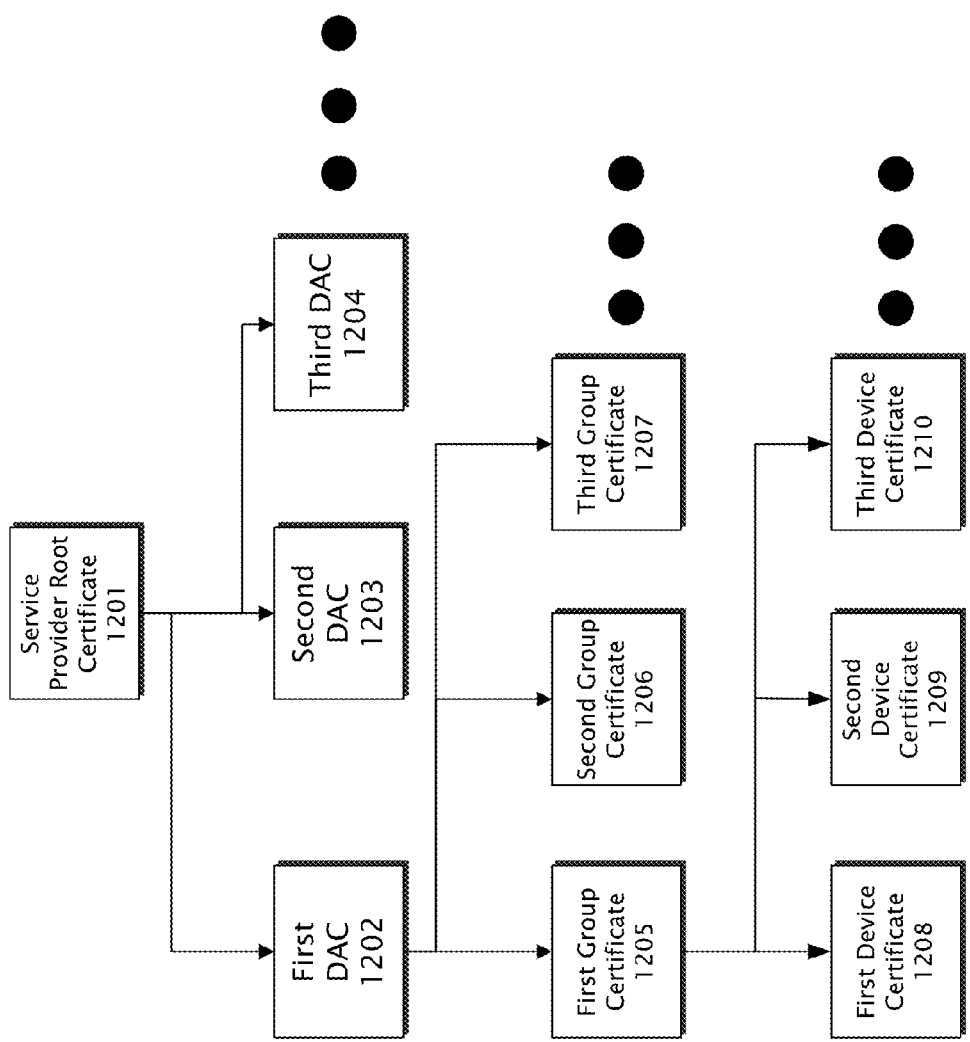
FIG. 12 is an illustration of a chain of trust structure present in an embodiment of a device certificate template.

FIG. 12 is an illustration of a chain of trust structure 1200 present in an embodiment of a device certificate template. In the chain of trust structure an authorization root certificate 1201 generates numerous Authorization certificates or DACs 1202, 1203, 1204 for individual OEMs. The DACS also may include a security level. Each horizontal level may be thought of as a link in the chain of trust as a path is traversed from top to bottom. Each link typically has a certificate associated with it to establish the validity of the link, and couple it to the previous and following link. For example blocks 1201, 1202, 1205, and 1208 may be thought of as links going from the authorization root link 1201 to the device certificate 1208. A device certificate template is typically formed by incorporating each link in the chain of trust in a section of fields that form the template.

From each DAC given to an OEM, that OEM can generate multiple group certificates 1205, 1206, 1207 for each model of device produced by the OEM. Device certificates 1208, 1209, 1210 are generated each device built and are based upon the group certificates. It is possible to change the levels of security by adding or removing levels of group certificates. For example a level of device certificates can be added to differentiate production runs of a particular model of consumer electronics device.

Alternatively the initialization of a device could be performed at manufacture off of the consumer electronic device, and then imaged onto the consumer electronic device. The initialization could be performed on a manufacturer's PC, and imaged onto the CE device.

The invention claimed is:

1. One or more computer-readable memory devices or storage devices storing instructions which, when executed by one or more processing units, cause the one or more processing units to:
access an instance of a device certificate template, wherein the device certificate template is shared by a plurality of devices of a product line and the device certificate template includes product line characteristics of the plurality of devices of the product line; and
use the instance of the device certificate template and information specific to an individual device of the plurality of devices to obtain a device certificate for the individual device, wherein the information specific to the individual device distinguishes the individual device from other devices of the product line,
wherein the device certificate that is obtained using the instance of the device certificate template and the information specific to the individual device enables the individual device to access protected content, and
wherein the device certificate template provides a chain of trust structure linking a first certificate associated with a manufacturer of the individual device to a second certificate associated with a certificate authority.

2. The one or more computer-readable memory devices or storage devices of claim 1, the stored instructions further causing the processor to:
access another instance of the device certificate template; and
use the another instance of the device certificate template and other information specific to another individual device of the plurality of devices to obtain another device certificate for the another individual device,
wherein the instance of the device certificate template and the another instance of the device certificate template are identical, the information and the other information are different, and the device certificate and the another device certificate are different.

3. The one or more computer-readable memory devices or storage devices of claim 1, wherein the instance of the device certificate template is stored on the individual device when accessed and the using comprises:
sending the instance of the device certificate template and the information specific to the individual device to another device that creates the device certificate for the individual device; and
receiving the device certificate from the another device.

4. The one or more computer-readable memory devices or storage devices of claim 3, wherein the product line characteristics included in the device certificate template comprise device features of the plurality of devices of the product line that distinguish the plurality of devices of the product line from another product line having different device features.

5. The one or more computer-readable memory devices or storage devices of claim 4, wherein the first certificate is a device authorization certificate and the second certificate is an authorization root certificate.

6. The one or more computer-readable memory devices or storage devices of claim 4, the stored instructions further causing the processor to:
create a challenge comprising the instance of the device certificate template, the information specific to the individual device, and a public key;
send the challenge to the another device; and
store a private key corresponding to the public key on the individual device.

7. The one or more computer-readable memory devices or storage devices of claim 6, the stored instructions further causing the processor to:
receive the device certificate from the another device in an encrypted form; and
decrypt the device certificate using the private key.

8. A computing device comprising:
one or more processing units; and
one or more memory devices or storage devices storing instructions which, when executed by the one or more processing units, cause the one or more processing units to:
access a device certificate template for a product line, wherein the computing device is one of a plurality of devices of the product line and the device certificate template identifies one or more device features that are common to the plurality of devices of the product line; and use the device certificate template and information specific to the computing device to obtain a device certificate for the computing device, wherein:

the device certificate enables the computing device to access protected content, the device certificate template comprises another certificate associated with a manufacturer of the plurality of computing devices of the product line, and the one or more device features included in the device certificate template distinguish the product line from at least some other product lines.

9. The computing device of claim 8, wherein the device certificate template comprises an authorization root certificate associated with a certificate authority.

10. A system comprising the computing device of claim 8 and a server configured to create the device certificate based on the device certificate template and the information specific to the computing device and send the device certificate to the computing device.

11. The system of claim 10, wherein the server is further configured to:

create the device certificate by filling in sections of the device certificate template with the information specific to the computing device;

create another device certificate for another computing device of the product line by filling in the sections of the device certificate template with other information specific to the another computing device; and send the another device certificate to the another computing device.

12. The computing device of claim 8, wherein the one or more device features identified by the device certificate template include a model identifier shared by each of the plurality of devices of the product line.

13. The computing device of claim 12, wherein the information specific to the computing device comprises a serial number of the computing device.

14. The computing device of claim 13, wherein the another certificate is a device authorization certificate.

15. The computing device of claim 8, wherein the device certificate template comprises a partial chain of trust that is completed by the device certificate.

16. The computing device of claim 8, wherein the instructions further cause the one or more processing units to:

generate a key pair comprising a public key and a private key;

store the private key on the computing device;

send the public key, the device certificate template, and the information specific to the computing device to another computing device that creates the device certificate and encrypts the device certificate using the public key;

receive the device certificate from the another computing device in encrypted form; and decrypt the device certificate using the private key.

17. A method performed by at least one computer processing unit, the method comprising:

populating a device certificate template to obtain a populated device certificate template comprising:

information common to a plurality of computing devices of a product line, an authorization certificate associated with a manufacturer of the plurality of computing devices of the product line, and an authorization root certificate associated with a certificate authority, wherein the plurality of computing devices have stored thereon different identifiers;

receiving, from the plurality of computing devices, the different identifiers; and using the populated device certificate template and the different identifiers to create a plurality of individualized device certificates for the plurality of computing devices responsive to receiving the different identifiers.

18. The method of claim 17, further comprising:

populating the device certificate template with a group certificate associated with the product line to obtain the populated device certificate template.

19. The method of claim 17, further comprising:

receiving a public key from a first computing device of the product line;

encrypting a first individualized device certificate with the public key; and sending the encrypted first individualized device certificate to the first computing device.

20. The method of claim 17, further comprising:

receiving different template instances of the populated device template from the plurality of computing devices, the different template instances having corresponding template signatures; and verifying the template signatures prior to creating the plurality of individualized device certificates.

21. The method of claim 20, further comprising:

receiving the different template instances in device certificate challenges having the different identifiers and challenge signatures; and verifying the challenge signatures prior to creating the plurality of individualized device certificates.

22. The method of claim 17, wherein the plurality of computing devices are provided to users with the populated device template stored thereon.

23. The method of claim 17, wherein the authorization certificate contains authorization from the certificate authority to the manufacturer to produce the plurality of individualized device certificates.

* * * * *